(12) United States Patent
Dobrowolski et al.

(10) Patent No.: US 6,271,968 B1
(45) Date of Patent: Aug. 7, 2001

(54) CUT-OFF FILTERS

(75) Inventors: J. A. Dobrowolski, Ottawa; Li Li, Orleans, both of (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/430,139

(22) Filed: Oct. 29, 1999

Related U.S. Application Data

(60) Provisional application No. 60/110,466, filed on Nov. 30, 1998.

(51) Int. Cl.[7] ............................ G02B 1/10; G02B 27/28; G02B 5/30
(52) U.S. Cl. .................... 359/583; 359/580; 359/495; 359/497; 359/498; 359/500
(58) Field of Search ..................... 359/580, 583, 359/494, 495, 496, 497, 498, 500

(56) References Cited

U.S. PATENT DOCUMENTS 5,124,841 * 6/1992 Oishi ........................... 359/487
5,808,798 * 9/1998 Weber et al. .................. 359/583
5,912,762 * 6/1999 Li et al. ........................ 359/498

* cited by examiner

*Primary Examiner*—Audrey Chang
(74) *Attorney, Agent, or Firm*—Marks & Clerk

(57) ABSTRACT

A cut-off filter is based on the use of light at non-normal angles of incidence and on the use of coating materials with a large dispersion of the optical constants. The filter has a pair of optical media respectively defining an inlet port and an outlet port and having an inclined interface such that a light beam passing between the inlet and outlet ports strikes the interface at a non-normal angle of incidence. An active core is sandwiched between the optical media at the interface. In one embodiment, the active core has a refractive index which has high dispersion in the vicinity of the predetermined cut-off wavelength and an extinction coefficient which is high on the cut-off side and low on the transmission side. The angle of incidence $\alpha$ is selected such that total internal reflection occurs at the predetermined wavelength $\lambda$ to bring about a sharp cut-off in the transmittance of the filter at the predetermined wavelength.

21 Claims, 12 Drawing Sheets a b c d

CUT-OFF FILTERS

CROSS-RELATED APPLICATIONS

This invention claims priority under 35 USC 119(e) from provisional application No. 60/110,466 filed on Nov. 30, 1998.

FIELD OF THE INVENTION

This invention relates to the field of optics, and more particularly to cut-off filters, particularly suitable for use at long wavelengths.

BACKGROUND OF THE INVENTION

There is a need in science and technology for short- and long-wavelength cut-off filters. An ideal cut-off filter would have a very sharp transition between the transmission and rejection regions. It would have very small losses in the transmission region and a high attenuation or reflectance in the rejection region over an extended spectral range. At oblique angles of incidence its performance would be independent of the polarization of the incident light and it would have a reasonable angular field.

For the visible range of wavelengths there is a very complete set of short-wavelength cut-off filters based on absorption in colored glasses or organic dyes. They are relatively cheap and convenient to use. Many companies provide such filters.

Unfortunately, a corresponding set of long-wavelength cut-off filters does not exist for the visible and adjacent near infrared spectral regions. In the past, solutions to this problem have been sought that are based on the interference of light in thin films. The thin film layers are usually deposited onto a plate glass substrate and they may or may not be protected with an additional cover plate. When the light is incident at an oblique angle, a second type of solution is possible in which the coating is deposited at the interface of two cemented prisms. Interference cut-off filters can be constructed with the transition occurring at any desired wavelength, and almost any desired rejection can be achieved provided that a sufficiently large number of layers is used. The disadvantage of these devices is that, in order to achieve a rejection over a wide range of wavelengths, a number of contiguous layer stacks have to be used and consequently the total number of layers in the resulting system can be quite large. Another disadvantage is that the range of wavelengths over which the transmittance is high can be relatively narrow, unless special designs are used, in which case the number of layers required is even larger.

SUMMARY OF THE INVENTION

According to the present invention there is provided an optical filter with a sharp cut-off at a predetermined wavelength $\lambda$, comprising a pair of optical media respectively defining an inlet port and an outlet port and having an inclined interface such that a light beam passing between said inlet and outlet ports strikes said interface at a non-normal angle of incidence θ; a functional core comprising at least one material sandwiched between said optical media at said interface, said functional core having a least one optical constant which, in a transition region, varies with wavelength, giving rise to a transition between transmission and rejection at said predetermined wavelength, and wherein said angle of incidence α is selected such that a sharp cut-off in the transmittance of the filter occurs at said predetermined wavelength $\lambda$.

In this specification, the term optical includes light in both the visible and infrared, consistent with common practice in the art.

In accordance with the principles of the invention, use is made of light at non-normal angles of incidence at least one coating material with special properties. Such a material should be transparent in the intended transmission region, but its refractive index n or extinction coefficient k should undergo a significant decrease or increase in this and in the adjoining longer or shorter wavelength spectral region. The dispersion in n or k gives rise to important properties, namely the transition from transmission to rejection, which becomes sharper at non-zero angles of incidence and the ability to change the cut-off wavelength by changing the angle of incidence.

Materials with such properties include indium tin oxide (ITO), doped tin oxide (for example, $SnO_2$:Sb), and cadmium tin oxide ($Cd_2SnO_4$). These materials are often used as transparent conducting films in electro-optical devices. They have also been proposed for use in various energy conversion and conservation applications. It is well known that substrates coated with these materials are transparent in the visible part of the spectrum, but that the coatings reflect strongly in the near infrared.

The invention also provides a method of filtering light comprising the step of passing a light beam at a non-normal angle of incidence through an active core sandwiched between a pair of optical media at an interface, said active core having a refractive index which has high dispersion in the vicinity of a predetermined cut-off wavelength $\lambda$ and an extinction coefficient which is high on the cut-off side and low on the transmission side of said predetermined wavelength $\lambda$; said non-normal angle of incidence α being selected such that total internal reflection occurs at said predetermined wavelength $\lambda$ to bring about a sharp cut-off in the transmittance of the filter at said predetermined wavelength.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
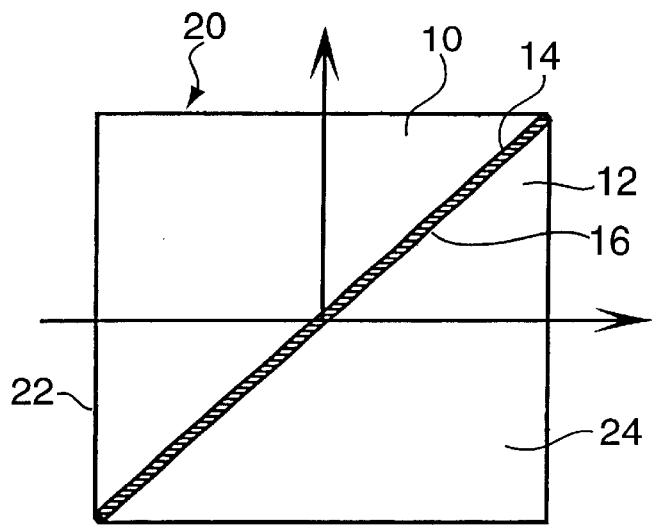
FIG. 1 shows the basic geometries of the new filter types: a) single component; b) array of smaller components; c), d) micro-prism sheet equivalents of the arrangements depicted in a) and b).
Figure 1:
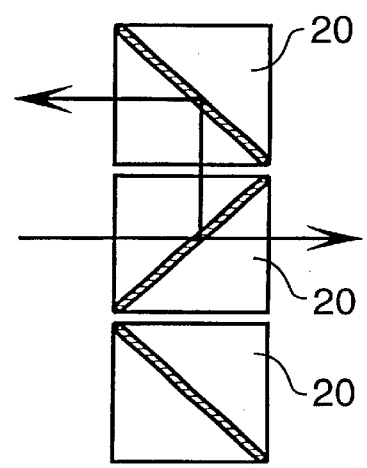
Figure 1:
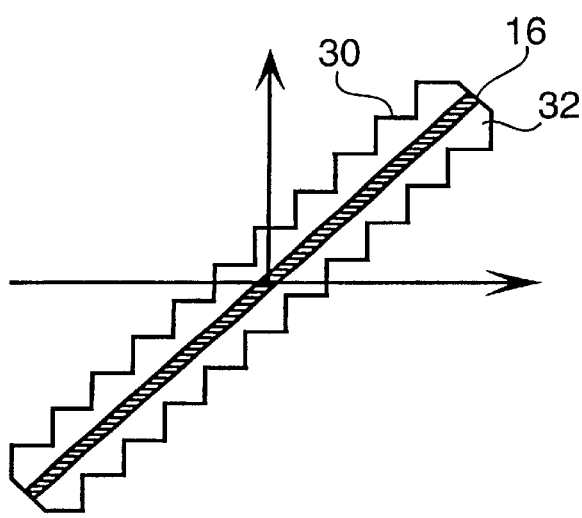
Figure 1:
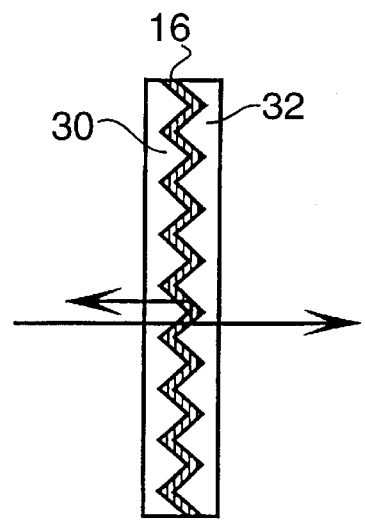

The basic filter design is shown in FIG. 1a. A pair of triangular prisms 10, 12, define a diagonal interface 14. At this interface is deposited an active core 16 whose properties will be discussed in more detail below. The active core typically consists of indium tin oxide (ITO) or other similar materials. The prisms are designed so that light entering the filter 20 through input port 22 and exiting through output port 24 strikes the interface 14 at a non-normal angle of incidence α, which in the example shown is 45°.

Figure 2:
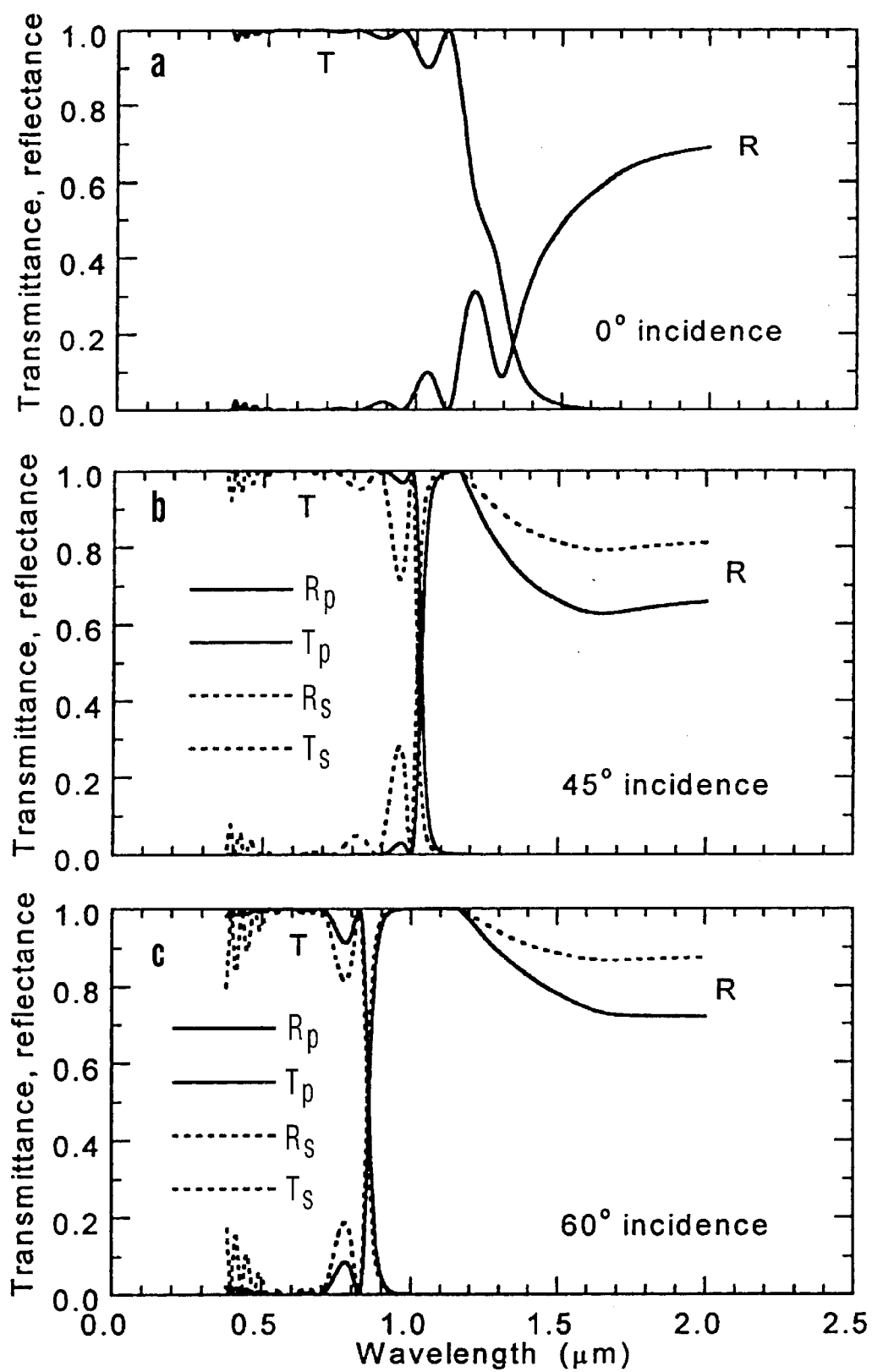
FIG. 2 shows the effect of angle of incidence on the transmittance and reflectance of a 1.0 μm thick ITO film embedded between glass of refractive index 1.70. The angles of incidence are 0° (a), 45° (b) and 60° (c).

In FIG. 2a is shown the calculated transmittance and reflectance of a 1 μm-thick ITO layer at normal incidence. The ITO film is sandwiched between two antireflection-coated glass plates with refractive index 1.70. It will be seen that it acts like a cut-off filter. However, the transition edge is not very sharp. The cut-off occurs approximately at 1.2 μm.

The new approach to cut-off filter design is demonstrated in FIGS. 2b and 2c. They show the calculated transmittances and reflectances of the same ITO film when it is embedded between two prisms of refractive index 1.70 so that the light is incident on the film at 45° and 60°. The transition from transmission to rejection at these angles is now much sharper and the transition wavelength has shifted to about 1.0 μm and 0.85 μm, respectively. For such an angle of incidence α significant polarization splitting is normally expected in two-material all-dielectric quarter wave stacks. However, polarization splitting of the cut-off in this new filter type is much less pronounced. Note also the complete reflectance at the long wavelength side of the cut-off for angles of incidence of 45° and 60°.

Figure 8:
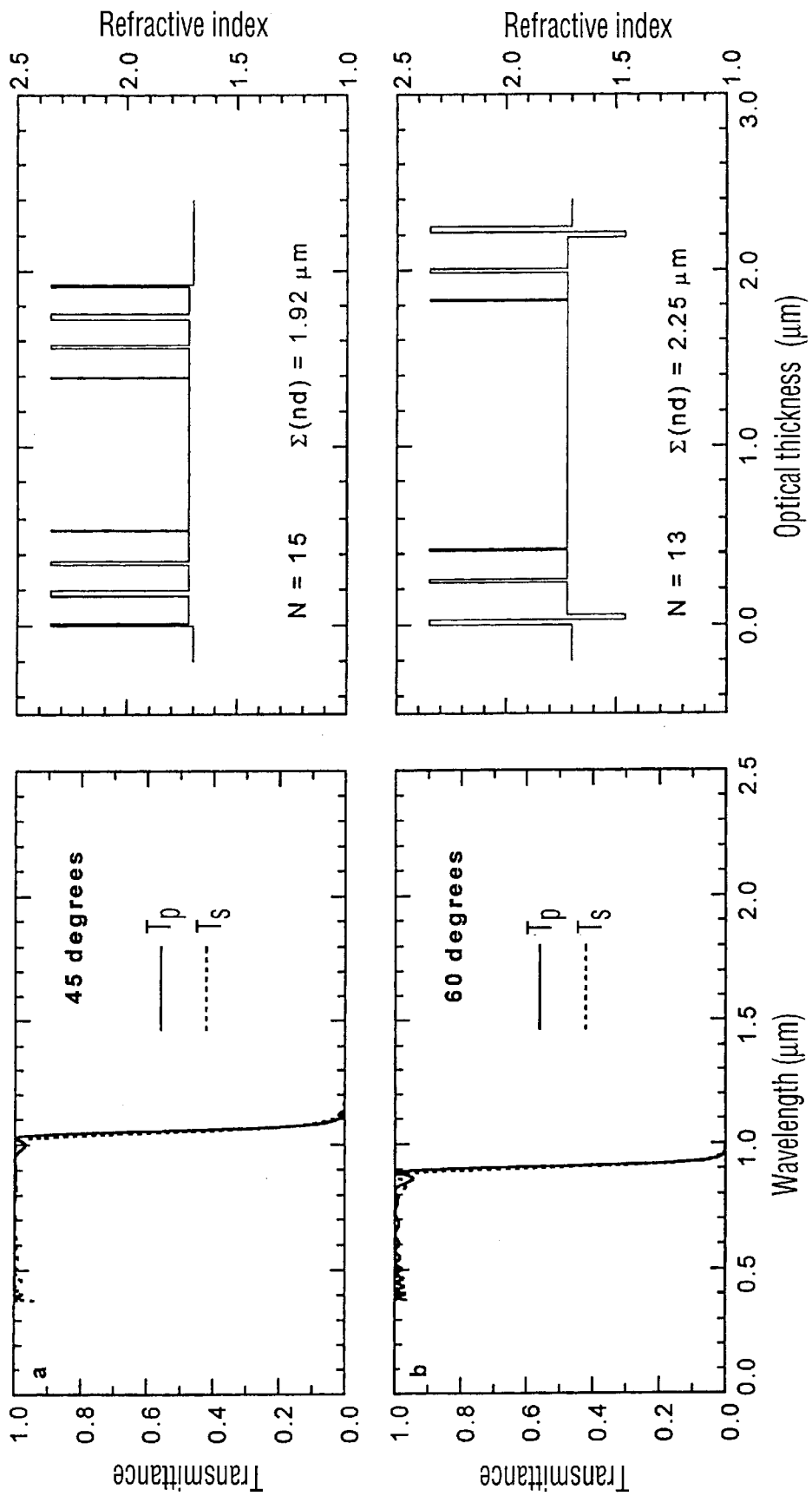
FIG. 8 shows the calculated performance and refractive index profiles of long wavelength cut-off filters based on the use of ITO embedded between glass prisms of refractive index 1.70 and designed for (a) 45° and (b) 60° incidence of light. (See text for more details).

The construction parameters for the filter shown in FIG. 8 are as follows:

| Layer Number | 45° cut-off filter | | 60° cut-off filter | |
|---|---|---|---|---|
| | Index./material | Thickness (μm) | Index./material | Thickness (μm) |
| entrance | 1.700 | | 1.700 | |
| 1 | 2.3500 | 0.0056 | 2.3500 | 0.0125 |
| 2 | ITO | 0.0893 | 1.46 | 0.0201 |
| 3 | 2.3500 | 0.0136 | ITO | 0.1044 |
| 4 | ITO | 0.0865 | 2.3500 | 0.0090 |
| 5 | 2.3500 | 0.0073 | ITO | 0.0894 |
| 6 | ITO | 0.0974 | 2.3500 | 0.0046 |
| 7 | 2.3500 | 0.0027 | ITO | 0.8125 |
| 8 | ITO | 0.4976 | 2.3500 | 0.0046 |
| 9 | 2.3500 | 0.0027 | ITO | 0.0894 |
| 10 | ITO | 0.0947 | 2.3500 | 0.0090 |
| 11 | 2.3500 | 0.0073 | ITO | 0.1044 |
| 12 | ITO | 0.0865 | 1.4600 | 0.0201 |
| 13 | 2.3500 | 0.0136 | 2.3500 | 0.0125 |
| 14 | ITO | 0.0893 | | |
| 15 | 2.3500 | 0.0056 | | |
| exit | 1.700 | | 1.700 | |
| Σ(d) | | 1.0968 | | 1.2924 |

THEORY

1. Smith's Method for Multilayer Design

It is convenient to investigate the behavior of the new type of cut-off filter using Smith's method of multilayer design as a starting point. It is well-known that the transmittance T and reflectance R of any multilayer can be expressed in terms of its amplitude transmission $\tau^+$ and reflection $\rho^+$ coefficients:

$$T = \frac{Re(N_m)}{Re(N_0)}(\tau^+)(\tau^+)^*, \quad (1)$$

$$R = \rho^+(\rho^+)^* \quad (2)$$

Figure 3:
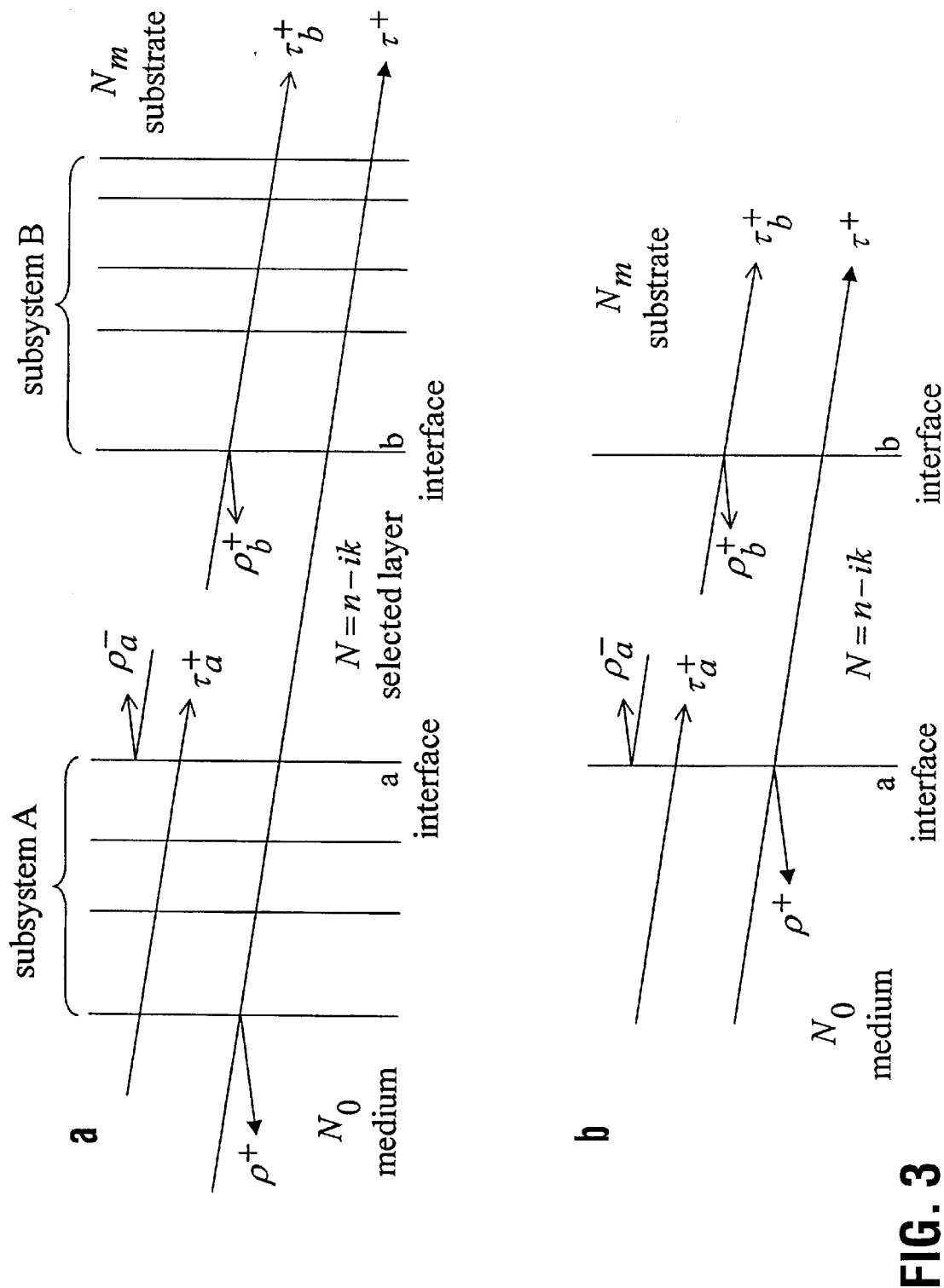
FIG. 3 is a schematic diagram for explaining Smith's method of thin film design.

In Smith's method (FIG. 3), the amplitude transmission $\tau^+$ and reflection $\rho^+$ coefficients are, in turn, expressed in terms of the phase thickness δ of anyone chosen layer at will within the multilayer and of the amplitude transmission $\tau_a$, $\tau_b$ and reflection $\rho_a$, $\rho_b$ coefficients of the subsystems adjoining the interfaces a, b of this layer:

$$\tau^+ = \frac{\tau_a^+ \tau_b^+ e^{-i\delta}}{1 - \rho_a^- \rho_b^+ e^{-2i\delta}}, \quad (3)$$

$$\rho^+ = \frac{\rho_a^+ \rho_b^+ e^{-2i\delta}}{1 - \rho_a^- \rho_b^+ e^{-2i\delta}}. \quad (4)$$

In Equation 1, $N_m$ (=$n_m$–$ik_m$), is the complex refractive index of the substrate and $N_0$(=$n_0$) is the real refractive index of the entrance medium. The + and – superscripts in Equations (1)–(4) indicate the direction of the light incidence for the amplitude transmission and reflection coefficients. By combining Equations (1) and (2) with Equations (3) and (4) one obtains $$T = \frac{Re(N_m)}{Re(N_0)} \frac{|\tau_a^+|^2|\tau_b^+|^2 e^{-2\beta}}{(1-|\rho_a^-||\rho_b^+|e^{-2\beta})^2 + 4|\rho_a^-||\rho_b^+|e^{-2\beta}\sin^2\left(\frac{\phi_a+\phi_b}{2}-\alpha\right)}, \quad (5)$$

-continued $$R = \frac{(|\rho_a^-| - |\rho_b^+|e^{-2\beta})^2 + 4|\rho_a^-||\rho_b^+|\sin^2\left(\frac{\phi_a + \phi_b}{2} - \alpha\right)}{(1 - |\rho_a^-||\rho_b^+|e^{-2\beta})^2 + 4|\rho_a^-||\rho_b^+|e^{-2\beta}\sin^2\left(\frac{\phi_a + \phi_b}{2} - \alpha\right)} \quad (6)$$

where $$\delta = (\alpha - i\beta) = \frac{2\pi}{\lambda}(n - ik)d\cos\theta \quad (7)$$

and $$\begin{cases} \tau_a^+ = |\tau_a^+|e^{i\phi'_a} \\ \tau_b^+ = |\tau_b^+|e^{i\phi'_b} \end{cases} \text{ and } \begin{cases} \rho_a^- = |\rho_a^-|e^{i\phi_a} \\ \rho_b^+ = |\rho_b^+|e^{i\phi_b} \end{cases} \quad (8)$$

In the above, n, k and d are the refractive index, extinction coefficient and thickness of the chosen layer and $\phi_a$, $\phi_b$ and $\phi'_a$, $\phi'_b$ are the phase changes on reflection at the a and b interfaces of the layer, for light incident in the forward and reverse directions.

Normally only the expression (5) for the transmittance is given. For the current purpose it is also useful to write down the corresponding Equation (6) for the reflectance. These equations are valid also for non-normal incidence of light, providing that the appropriate expressions for the phase thickness $\delta$ and the phase changes on transmission and reflection are used.

2. The Case of a Single Layer

As mentioned above, Equations (1)–(8) correspond to the general case of a system consisting of many layers. They can be considerably simplified if the multilayer consists of a single layer only with a complex refractive index N=n−ik (FIG. 3) and if one further assumes that the refractive indices of the incident and exit media are the same, $N_m = N_0$. One can then write $$\tau_a^+ \tau_b^+ = 1 - (\rho_a^-)^2, \quad (9)$$

$$\rho_a^+ = -\rho_a^- = -\rho_b^+ = \left(\frac{\eta_0 - \eta}{\eta_0 + \eta}\right) \quad (10)$$

and $$|\tau_a^+|^2|\tau_b^+|^2 = (1 - |\rho_a^-|^2)^2 + 4|\rho_a^-|^2\sin^2\phi_a, \quad (11)$$

$$|\rho_a^-|^2 = \left(\frac{\eta_0 - \eta}{\eta_0 + \eta}\right)\left(\frac{\eta_0 - \eta}{\eta_0 + \eta}\right)^* \quad (12)$$

By substituting (9) to (12) in Equations (5) and (6), one obtains the following expressions for the transmittance and reflectance of a single absorbing layer for non-normal incidence of light:

$$T = \frac{[(1 - |\rho_a^-|^2)^2 + 4|\rho_a^-|^2\sin^2\phi_a]e^{-2\beta}}{(1 - |\rho_a^-|^2e^{-2\beta})^2 + 4|\rho_a^-|^2e^{-2\beta}\sin^2(\phi_a - \alpha)}, \quad (13)$$

$$R = \frac{|\rho_a^-|^2(1 - e^{-2\beta})^2 + 4|\rho_a^-|^2\sin^2(\alpha)}{(1 - |\rho_a^-|^2e^{-2\beta})^2 + 4|\rho_a^-|^2e^{-2\beta}\sin^2(\phi_a - \alpha)}. \quad (14)$$

In the above equations, $$\begin{cases} \eta_0 = n_0\cos\theta_0 \\ \eta = (n - ik)\cos\theta \end{cases} (s - pol), \quad (15)$$

and $$\begin{cases} \eta_0 = n_0/\cos\theta_0 \\ \eta = (n - ik)/\cos\theta \end{cases} (p - pol).$$

The complex angle of refraction $\theta$ is given by Snell's Law, $$n_0 \sin \phi_0 = (n - ik)\sin\phi. \quad (16)$$

The phase thickness $\delta$ is also complex:

$$\delta = \frac{2\pi(n - ik)d\cos\theta}{\lambda} = \frac{2\pi d\sqrt{(n - ik)^2 - n_0^2\sin^2\theta_0}}{\lambda} = \alpha - i\beta. \quad (17)$$

where $$\alpha = \frac{\pi d\sqrt{\left(2\sqrt{(n^2 - k^2 - n_0^2\sin^2\theta_0)^2 + 4n^2k^2} + 2(n^2 - k^2 - n_0^2\sin^2\theta_0)\right)}}{\lambda}, \quad (18)$$

$$\beta = \frac{\pi d\sqrt{\left(2\sqrt{(n^2 - k^2 - n_0^2\sin^2\theta_0)^2 + 4n^2k^2} - 2(n^2 - k^2 - n_0^2\sin^2\theta_0)\right)}}{\lambda}. \quad (19)$$

In particular, Equations (13), (14) can be used to explain the spectral and angular behavior of single layers of materials having a strong dispersion of the refractive index in the neighborhood of the wavelength at which the materials start to absorb. In any one part of the spectrum, this behavior will depend strongly on the relative values of $n_0$, n, k and on d. Four special cases are considered in greater detail in the following.

2a. $n_0 = n$ and $k = 0$

At wavelengths at which the refractive index of the film is equal to those of the surrounding media and at which it does not absorb, Equations (9), (10) reduce to $$\tau_a^+ \tau_b^+ = 1 - (\rho_a^-)^2 = 1, \quad (20)$$

$$\rho_a^+ = -\rho_a^- = -\rho_b^+ = \left(\frac{\eta_0 - \eta}{\eta_0 + \eta}\right) = 0. \quad (21)$$

It follows from Equations (12) to (14) that:

$$|\rho_a^-|^2 = 0 \quad (22)$$

and $$\begin{cases} T = 1.0 \\ R = 0 \end{cases}. \quad (23)$$

This is true for both s- and p-polarized light and for all angles of incidence. For a film of optical thickness greater than a half wave and a small difference between the refractive indices, one would expect spectral transmittances oscillating between 1.0 and values whose departures from unity increase with $|\eta-\eta_0|$ in this type of filter. This is the behavior of a typical non-absorbing layer. Since $|\eta-\eta_0|$ increases with angle of incidence, the transmittance oscillations also increase. In addition, the oscillations have different amplitudes for s- and p-polarized light due to the difference of $|\eta-\eta_0|$.

2b. n=0 and k≠0

If the above values for n and k are substituted in Equations (15), (16), (14), (18) and (19), one obtains $$\begin{cases} \eta_0 = n_0\cos\theta_0 \\ \eta = -ik\cos\theta \end{cases} (s-pol), \quad (24)$$

and $$\begin{cases} \eta_0 = n_0/\cos\theta_0 \\ \eta = -ik/\cos\theta \end{cases} (p-pol),$$

$$\cos\theta = \sqrt{1 + \frac{n_0^2\sin^2\theta_0}{k^2}}, \quad (25)$$

$$|\rho_a^-|^2 = \left(\frac{\eta_0-\eta}{\eta_0+\eta}\right)\left(\frac{\eta_0-\eta}{\eta_0+\eta}\right)^* = 1, \quad (26)$$

$$\begin{cases} \alpha = 0 \\ \beta = \frac{2\pi d\sqrt{k^2+n_0^2\sin^2\theta_0}}{\lambda} \end{cases}, \quad (27)$$

Substitution of Equations (24) to (27) in (13) and (14) results in the following expressions for the transmittance and reflectance of the layer:

$$\begin{cases} T = \frac{4e^{-2\beta}\sin^2\phi_a}{(1-e^{-2\beta})^2 + e^{-2\beta}\sin^2(\phi_a)} \\ R = \frac{(1-e^{-2\beta})^2}{(1-e^{-2\beta})^2 + 4e^{-2\beta}\sin^2(\phi_a)} \end{cases}. \quad (28)$$

One can conclude from the above that the transmittance will decrease and the reflectance will increase with increase in thickness or of the angle of incidence. This is what one would expect from an "ideal metal". A similar behavior is observed when n≠0, but is so small that k>>n. This explains why materials such as silver have high reflectances and zero transmittances in the infrared spectral region.

2c. n≠0 and k≠0

From Equation (19) it is seen that β increases linearly with the thickness d of the layer, and hence it follows from Equation (13) that, for a given extinction coefficient, the transmittance is decreased as the thickness of the layer is increased. Further, by differentiation of Equation (19) it is possible to obtain the following expression for the derivative of β with regard to $\phi_0$:

$$\frac{\partial\beta}{\partial\theta_0} = \frac{\pi d}{\lambda} \frac{2\sin(2\theta_0)\left(\sqrt{\gamma^2+4n^2k^2}-\gamma\right)}{\sqrt{\gamma^2+4n^2k^2}\sqrt{\sqrt{\gamma^2+4n^2k^2}-\gamma}} \geq 0 \quad (29)$$

where $$\gamma = (n^2 - k^2 - n_0^2\sin^2\phi_0). \quad (30)$$

It follows from Equations (19) and (29) that δ is always positive and that its value increases with the angle of incidence $\phi_0$ for both s- and p-polarized light. For a given layer thickness, the transmittance of the layer will therefore decrease with increasing angle of incidence. This is why the transmittance edge always shifts towards shorter wavelengths in the absorption region as the angle of incidence increases for the case in which the extinction coefficient increases with wavelength. However, because the amplitude reflection coefficients $\rho_a^-$ are different for s- and p-polarized light, there will usually be a difference between the absorption edges for these two cases. This difference will decrease with thickness of the layer and with angle of incidence.

2d. n≠0, k=0 and $n_0$>n and $\phi_0>\phi_c$ (critical angle)

Finally, the case is considered in which the layer is non-absorbing, but has a refractive index that is smaller than that of the surrounding media. It is further assumed that the angle of incidence $\phi_0$ is greater than the critical angle, $\phi_c$:

$$\theta_c = \sin^{-1}\left(\frac{n}{n_0}\right). \quad (31)$$

Under these conditions, it follows from Equation (16) that $$\cos\theta = -i\sqrt{\frac{n_0^2\sin^2\theta_0}{n^2}-1}. \quad (32)$$

Substituting this expression in Equations (15) one obtains $$\begin{cases} \eta_0 = n_0\cos\theta_0 \\ \eta = -i\sqrt{n_0^2\sin^2\theta_0 - n^2} \end{cases} (s-pol), \quad (33)$$

and $$\begin{cases} \eta_0 = n_0/\cos\theta_0 \\ \eta = -in^2/\sqrt{n_0^2\sin^2\theta_0 - n^2} \end{cases} (p-pol).$$

When, in turn, these expressions are substituted in Equations (12), (18), (19), (13) and (14), the following results are obtained that do not depend on the plane of polarization of the incident light:

$$|\rho_a^-|^2 = \left(\frac{\eta_0-\eta}{\eta_0+\eta}\right)\left(\frac{\eta_0-\eta}{\eta_0+\eta}\right)^* = 1. \quad (34)$$

$$\begin{cases} \alpha = 0 \\ \beta = \frac{2\pi d\sqrt{k^2+n_0^2\sin^2\theta_0}}{\lambda} \end{cases}, \quad (35)$$

-continued $$\begin{cases} T = \dfrac{4e^{-2\beta}\sin^2\phi_a}{(1-e^{-2\beta})^2 + e^{-2\beta}\sin^2(\phi_a)} \\ R = \dfrac{(1-e^{-2\beta})^2}{(1-e^{-2\beta})^2 + 4e^{-2\beta}\sin^2(\phi_a)} \end{cases} \quad (36)$$

It follows from the above that, for light incident above the critical angle, the transmittance and reflectance decrease and increase, respectively, with the increase of angles of incidence. If the film is very thick, then the total internal reflection occurs and T=1.0 and R=0.0. In a spectral region in which the refractive index of the layer varies rapidly with wavelength, the critical angle (and hence the cut-off wavelength) will also vary rapidly with wavelength. It follows that the transmittance edge depends on the critical angle, which, in turn, depends on the variation of the refractive index with wavelength.

Note that no critical angle exists when $n_0 < n$. In such a case the absorption is the only contributor to the transmittance edge which must therefore always lie within the absorption band. In addition, in this case there will be a displacement between cut-off edges for s- and p-polarized light. However, this displacement will become smaller with increase of the layer thickness due to increased absorption.

The statements in the previous paragraph will also hold for the cases in which $n_0 > n$, but for angles of incidence that are smaller than the critical angle. In that case absorption will be the main contributor to the formation of the cut-off edge and the displacement between the edges for s- and p-polarized light will again decrease with increase in the layer thickness.

3. Conditions for Transition from High to Low Transmittance

A more detailed analytical analysis of the cases noted above follows. In general, the transmittance of the functional core in a single layer case can be expressed as:

$$T = \frac{\operatorname{Re}(N_m)}{\operatorname{Re}(N_0)} \frac{|\tau_a^+|^2 |\tau_b^+|^2 e^{-2\beta}}{(1-|\rho_a^-||\rho_b^+|e^{-2\beta})^2 + 4|\rho_a^-||\rho_b^+|e^{-2\beta}\sin^2\left(\dfrac{\phi_a+\phi_b}{2}-\alpha\right)}, \quad (5)$$

where $\delta$ is the phase thickness:

$$\delta = \frac{2\pi(n-ik)d\cos\theta}{\lambda} = \frac{2\pi d\sqrt{(n-ik)^2 - n_0^2\sin^2\theta_0}}{\lambda} = \alpha - i\beta, \quad (17)$$

and, $\alpha$ and $\beta$ are the real and imaginary parts of the phase thickness respectively. $\beta$ facts like an attenuator in the transmittance T. T decreases exponentially with $\beta$. Clearly the transmittance T is a function of $\beta$, $T=f(-2\beta)$. In turn, $\beta$ is a function of $n$, $k$, $n_0$, $\phi_0$ and $\lambda$. Therefore $dT/d\lambda$ can be simplified to verify $\partial\beta/\partial\lambda$ since:

$$\frac{dT}{d\lambda} = -2\frac{dT}{d(-2\beta)}\frac{\partial\beta}{\partial\lambda}. \quad (37)$$

In the following descriptions, two separate cases will be discussed. In the first case, the transition is caused by the dispersion of the refractive index n, or $dn/d\lambda$. In the second case, the transition is caused by the dispersion of the extinction coefficient k, or $dk/d\lambda$.

3a. First case, k=0 or very small (k≈0), $n<n_0$, $\phi_0>\phi_C$.

The transition is caused by the high dispersion in the refractive index (n) (n either increases or decreases with $\lambda$)

in combination with an angle of incidence larger than the critical angle (otherwise, $\beta=0$). In this case, $$\cos\theta = -i\sqrt{\frac{n_0^2\sin^2\theta_0}{n^2}-1}. \quad (32)$$

Therefore, $\beta$ can be simplified in the following way:

$$\begin{cases} \beta = 2\pi d\dfrac{\sqrt{n_0^2\sin^2\theta_0 - n^2}}{\lambda} = 2\pi d\dfrac{\sqrt{A}}{\lambda} \\ A = n_0^2\sin^2\theta_0 - n^2 \end{cases} \quad (35)$$

The derivative of $\partial\beta/\partial\lambda$ is given by:

$$\frac{\partial\beta}{\partial\lambda} = 2\pi d\left(\frac{\sqrt{A}}{\lambda}\frac{1}{2A}\frac{dA}{d\lambda} - \frac{\sqrt{A}}{\lambda}\frac{1}{\lambda}\right) = \beta\left(\frac{1}{2A}\frac{dA}{d\lambda} - \frac{1}{\lambda}\right), \quad (38a)$$

Since, $$\frac{dA}{d\lambda} = -2n\frac{dn}{d\lambda}, \quad (38b)$$

$$\frac{\partial\beta}{\partial\lambda} = -\beta\left(\frac{n\dfrac{dn}{d\lambda}}{A} + \frac{1}{\lambda}\right) = -\beta n\lambda\frac{dn}{d\lambda} + \frac{A}{\lambda A}; \quad (38c)$$

where $\beta$ and A are always greater than zero since $n_0\sin\phi_0>n$.

How to Form a Transition in Transmittance

If $dn/d\lambda<0$ and $$\frac{dn}{d\lambda} < -\frac{A}{n\lambda} = -\frac{(n_0^2\sin^2\theta_0 - n^2)}{n\lambda}, \quad (39)$$

from equation (38c), we know that $\partial\beta/\partial\lambda$ is always larger than zero. Therefore, the gradient $dn/d\lambda$ causes the variation of $\partial\beta/\partial\lambda$ which in turn causes the variation of $dT/d\lambda$. $\beta$ increases and the transmittance T decreases with wavelength. Therefore, a transition in transmittance is obtained. This filter is a long wavelength cut-off filter. Equation (39) gives the minimum required gradient $dn/d\lambda$ in order to obtain a transition. If the dispersion is smaller, so will be the transition in transmittance and this will be of little interest for the formation of cut-off filters.

If $dn/d\lambda>0$, we know from equation (38c) that $\partial\beta/\partial\lambda$ is always smaller than zero. Therefore, the gradient $dn/d\lambda$ also causes the variation of $\partial\beta/\partial\lambda$ and this, in turn, causes the variation of $dT/d\lambda$. $\beta$ decreases and the transmittance T increases with wavelength. Therefore, a transition in transmittance is obtained. This filter is a short wavelength cut-off filter.

How to Shift the Wavelength by Varying the Angle of Incidence

A small change in the angle of incidence $\Delta\phi_0$ will cause a small change $\Delta\beta$ and a small shift of the transmission wavelength $\Delta\lambda$. The relationship between $\Delta\beta$ and $\Delta\phi_0$ and $\Delta\lambda$ can be obtained by differentiating equation (35):

$$\Delta\beta = 2\pi d \frac{\lambda \frac{\Delta A}{2A} - \sqrt{A}\,\Delta\lambda}{\lambda^2} = \beta\left(\frac{\Delta A}{2A} - \frac{\Delta\lambda}{\lambda}\right) = \beta\frac{\lambda\Delta A - 2A\Delta\lambda}{2A\lambda}. \quad (40a)$$

$$\Delta A = 2n_0^2 \sin\theta_0 \cos\theta_0 \Delta\theta_0 - 2n\frac{dn}{d\lambda}\Delta\lambda. \quad (40b)$$

At the transition or the cut-off wavelength, the transmittance T or β remains the same, therefore, Δβ=0. From equation (40a), we obtain:

$$\lambda\Delta A - 2A\Delta\lambda = 0, \quad (41)$$

and, $$\Delta\theta_0 = \frac{n\lambda\frac{dn}{d\lambda} + A}{\lambda n_0^2 \sin\theta_0 \cos\theta_0}\Delta\lambda = \frac{n\lambda\frac{dn}{d\lambda} + (n_0^2 \sin^2\theta_0 - n^2)}{\lambda n_0^2 \sin\theta_0 \cos\theta_0}\Delta\lambda = \frac{D}{F}\Delta\lambda, \quad (42a)$$

where $$\begin{cases} D = \left[n\lambda\frac{dn}{d\lambda} + (n_0^2\sin^2\theta_0 - n^2)\right] \\ F = \lambda n_0^2 \sin\theta_0 \cos\theta_0 \end{cases}. \quad (42b)$$

F is always greater than zero.

If dn/dλ<0, it follows from equation (39) that D<0 and therefore, Δφ$_0$ and Δλ have opposite sign. In other words, if we increase φ$_0$, the cut-off wavelength will shift to a shorter wavelength.

If dn/dλ>0, it follows from equation (42b) that D>0, therefore, Δφ$_0$ and Δλ have the same sign. In other words, if we increase φ$_0$, the cut-off wavelength will shift to a longer wavelength.

How to Sharpen the Transition

The sharpness of the transition can be expressed by ∂β/∂λ at the transition or cut-off wavelength. The larger the absolute value of ∂β/∂λ, the sharper will be the transition. From equation (38) we obtain:

$$\frac{\partial\beta}{\partial\lambda} = -\beta\left(\frac{n\frac{dn}{d\lambda}}{A} + \frac{1}{\lambda}\right) = -\beta f(\theta_0, \lambda). \quad (43)$$

Therefore Δ(∂β/∂λ) can be written as follows:

$$\Delta\left(\frac{\partial\beta}{\partial\lambda}\right) = -\beta\Delta f - f\Delta\beta. \quad (44)$$

Since Δβ is zero at the transition or cut-off wavelength, it follows that $$\begin{cases} \Delta\left(\frac{\partial\beta}{\partial\lambda}\right) = -\beta\Delta f \\ = -\beta\left(\frac{A\left(n\frac{d^2n}{d\lambda^2} + \left(\frac{dn}{d\lambda}\right)^2\right)\Delta\lambda - n\frac{dn}{d\lambda}\Delta A}{A^2} - \frac{\Delta\lambda}{\lambda^2}\right) \\ = -\beta\left(\frac{(n_0^2\sin^2\theta_0 - n^2)\left[\left(n\frac{d^2n}{d\lambda^2} + \left(\frac{dn}{d\lambda}\right)^2\right)\Delta\lambda - \right.}{A^2} - \frac{\Delta\lambda}{\lambda^2}\right)\\ \left.\frac{n\frac{dn}{d\lambda}\left(2n_0^2\sin\theta_0\cos\theta_0\Delta\theta_0 - 2n\frac{dn}{d\lambda}\Delta\lambda\right)\right]}{A^2}\right) \end{cases} \quad (45)$$

If equation (42a) is used to replace Δφ$_0$ in the above equation, we obtain $$\Delta\left(\frac{\partial\beta}{\partial\lambda}\right) = -\beta\left(\frac{(n_0^2\sin^2\theta_0 - n^2)\left[\left(n\frac{d^2n}{d\lambda^2} + \left(\frac{dn}{d\lambda}\right)^2\right)\Delta\lambda - \right.}{A^2} - \frac{\Delta\lambda}{\lambda^2}\right) \quad (46)$$
$$\left.\frac{n\frac{dn}{d\lambda}\left[2\frac{\Delta\lambda}{\lambda}(n_0^2\sin^2\theta_0 - n^2)\right]}{A^2}\right.$$

$$= -\beta\left(\frac{\left[\left(n\frac{d^2n}{d\lambda^2} + \left(\frac{dn}{d\lambda}\right)^2\right)\Delta\lambda\right]}{A} - \frac{2n\frac{dn}{d\lambda}\Delta\lambda}{\lambda A} - \frac{\Delta\lambda}{\lambda^2}\right)$$

$$= -\beta\Delta\lambda\left(\frac{n\frac{d^2n}{d\lambda^2} + \left(\frac{dn}{d\lambda}\right)^2}{A} - \frac{2n\lambda\frac{dn}{d\lambda} + A}{\lambda^2 A}\right) = -\beta\Delta\lambda g$$

where, $$g = \left(\frac{n\frac{d^2n}{d\lambda^2} + \left(\frac{dn}{d\lambda}\right)^2}{A} - \frac{2n\lambda\frac{dn}{d\lambda} + A}{\lambda^2 A}\right) \quad (47)$$

$$= \left(\frac{\lambda^2\left[n\frac{d^2n}{d\lambda^2} + \left(\frac{dn}{d\lambda}\right)^2\right] - \left(2n\lambda\frac{dn}{d\lambda} + A\right)}{\lambda^2 A}\right)$$

where $$g > 0, \quad \lambda^2\left[n\frac{d^2n}{d\lambda^2} + \left(\frac{dn}{d\lambda}\right)^2\right] > 2n\lambda\frac{dn}{d\lambda} + A. \quad (48)$$

$$g < 0, \quad \lambda^2\left[n\frac{d^2n}{d\lambda^2} + \left(\frac{dn}{d\lambda}\right)^2\right] < 2n\lambda\frac{dn}{d\lambda} + A. \quad (49)$$

For the case dn/dλ<0, at the transition wavelength ∂β/∂λ>0. If Δφ$_0$>0, then Δλ<0, and if g>0, then Δ(∂β/∂λ)>0 from equation (46). This means that the sharpness increases with angle of incidence. If g<0, then Δ(∂β/∂λ)<0 and the sharpness decreases with angle of incidence.

For the simple case in which dn/dλ is a linear function of λ or d²n/dλ²≧0, the above equation can be simplified using equation (39). One obtains $$g > \left(\frac{\left[n\frac{d^2n}{d\lambda^2} + \left(\frac{dn}{d\lambda}\right)^2\right]}{A} + \frac{-n\lambda\frac{dn}{d\lambda}}{\lambda^2 A}\right) > 0. \quad (50)$$

In this situation, the sharpness always increases with the angle of incidence.

For the case dn/dλ>0, at the transition wavelength, ∂β/∂λ<0. If Δφ$_0$>0, then Δλ>0, and if g>0, then Δ(∂β/∂λ)<0. The absolute value of (∂β/∂λ) increases with angle of incidence. This means that the sharpness increases with angle of incidence as well. If g<0, then Δ(∂β/∂λ)>0 and the sharpness decreases with angle of incidence.

The above discussions demonstrate that the sharpness depends on the function of g. In some cases the sharpness will increase and in other cases it will decrease with angle of incidence.

3b. Second case, k≠0, n=constant or dn/dλ<<dk/dλ

The transition is caused by the high dispersion in the extinction coefficient k (n either increases or decreases with λ). In this case, $$\beta = \sqrt{2}\,\pi d\,\frac{\sqrt{-(n^2-k^2-n_0^2\sin^2\theta_0)+\sqrt{(n^2-k^2-n_0^2\sin^2\theta_0)^2+4n^2k^2}}}{\lambda} \qquad (51)$$

$$= \sqrt{2}\,\pi d\,\frac{\sqrt{A}}{\lambda}.$$

where $\beta$ is always greater than zero and, $$A = -(n^2-k^2-n_0^2\sin^2\theta_0)+ \qquad (52)$$
$$\sqrt{(n^2-k^2-n_0^2\sin^2\theta_0)^2+4n^2k^2}$$
$$= -B + \sqrt{B^2+C^2}\,.$$

The derivative of $\partial\beta/\partial\lambda$ is given by:

$$\frac{\partial\beta}{\partial\lambda} = \sqrt{2}\,\pi d\left(\frac{\sqrt{A}}{\lambda}\frac{1}{2A}\frac{dA}{d\lambda} - \frac{\sqrt{A}}{\lambda^2}\right) = \beta\left(\frac{1}{2A}\frac{dA}{d\lambda} - \frac{1}{\lambda}\right). \qquad (53a)$$

$$\begin{cases} \dfrac{dA}{d\lambda} = -\Delta B + \dfrac{B\Delta B + C\Delta C}{\sqrt{B^2+C^2}} = \dfrac{2(kA+nC)\dfrac{dk}{d\lambda}}{\sqrt{B^2+C^2}} & (53b)\\[2mm] \dfrac{dB}{d\lambda} = -2k\dfrac{dk}{d\lambda} \\[2mm] \dfrac{dC}{d\lambda} = 2n\dfrac{dk}{d\lambda} \end{cases}$$

$$\begin{cases} \dfrac{\partial\beta}{\partial\lambda} = \beta\left(\dfrac{(kA+nC)\dfrac{dk}{d\lambda}}{A\sqrt{B^2+C^2}} - \dfrac{1}{\lambda}\right) \\[4mm] \quad = \dfrac{(kA+nC)\lambda\dfrac{dk}{d\lambda} - A\sqrt{B^2+C^2}}{\lambda A\sqrt{B^2+C^2}} \end{cases} \qquad (53c)$$

How to Form a Transition in Transmittance

If $dk/d\lambda < 0$, it follows from equation (53c) that $\partial\beta/\partial\lambda$ will always be smaller than zero. Therefore, the gradient $dk/d\lambda$ also causes a variation in $\partial\beta/\partial\lambda$ and this, in turn, causes a variation in $dT/d\lambda$. $\beta$ decreases and the transmittance T increases with wavelength. Therefore, a transition in transmittance is obtained. This filter is a short wavelength cut-off filter.

If $dk/d\lambda > 0$ and $$\frac{dk}{d\lambda} > \frac{A\sqrt{B^2+C^2}}{\lambda(kA+nC)}, \qquad (54)$$

It follows from equation (53c) that $\partial\beta/\partial\lambda$ is always larger than zero. Therefore, the gradient $dk/d\lambda$ causes a variation of $\partial\beta/\partial\lambda$ and this, in turn, causes a variation in $dT/d\lambda$. $\beta$ increases and the transmittance T decreases with wavelength. Therefore, a transition in transmittance is obtained. This filter is a long wavelength cut-off filter. Equation (54) gives the minimum required gradient $dk/d\lambda$ in order to obtain a transition. If the dispersion is rather small, so will be the transition in transmission and it will be of little interest for the formation of cut-off filters.

How to Shift the Wavelength by Varying the Angle of Incidence

A small change in the angle of incidence $\Delta\phi_0$ will cause a small change $\Delta\beta$ and a small shift of the transmission wavelength $\Delta\lambda$. The relationship between $\Delta\beta$ and $\Delta\phi_0$ and $\Delta\lambda$ can be obtained by differentiating equation (51):

$$\Delta\beta = \sqrt{2}\,\pi d\left(\frac{\Delta A}{2A}\frac{\sqrt{A}}{\lambda} - \frac{\Delta\lambda}{\lambda}\frac{\sqrt{A}}{\lambda}\right) = \beta\left(\frac{\Delta A}{2A} - \frac{\Delta\lambda}{\lambda}\right). \qquad (55a)$$

$$\begin{cases} \Delta A = -\Delta B + \dfrac{B\Delta B + C\Delta C}{\sqrt{B^2+C^2}} = \dfrac{-\left(-B+\sqrt{B^2+C^2}\right)\Delta B + C\Delta C}{\sqrt{B^2+C^2}} \\[3mm] \quad = \dfrac{2(kA+nC)\dfrac{dk}{d\lambda}\Delta\lambda + 2An_0^2\sin\theta_0\cos\theta_0\Delta\theta_0}{\sqrt{B^2+C^2}} \\[3mm] \Delta B = -2k\dfrac{dk}{d\lambda}\Delta\lambda - 2n_0^2\sin\theta_0\cos\theta_0\Delta\theta_0 \\[2mm] \Delta C = 2n\dfrac{dk}{d\lambda}\Delta\lambda \end{cases} \qquad (55b)$$

$$\Delta\beta = \beta\left(\frac{(kA+nC)\dfrac{dk}{d\lambda}\Delta\lambda + An_0^2\sin\theta_0\cos\theta_0\Delta\theta_0}{A\sqrt{B^2+C^2}} - \frac{\Delta\lambda}{\lambda}\right) \qquad (55c)$$

$$= \beta\frac{\left[(kA+nC)\lambda\dfrac{dk}{d\lambda} - A\sqrt{B^2+C^2}\right]\Delta\lambda + A\lambda n_0^2\sin\theta_0\cos\theta_0\Delta\theta_0}{A\sqrt{B^2+C^2}}.$$

If, at the transition or cut-off wavelength, the transmittance T or $\beta$ remains constant, we get $\Delta\beta = 0$. From equation (55c), it follows that:

$$\Delta\theta_0 = \frac{-(kA+Cn)\lambda\dfrac{dk}{d\lambda} + A\sqrt{B^2+C^2}}{\lambda An_0^2\sin\theta_0\cos\theta_0}\Delta\lambda = \frac{D}{F}\Delta\lambda, \qquad (56)$$

where $$\begin{cases} D = -(kA+nC)\lambda\dfrac{dk}{d\lambda} + A\sqrt{B^2+C^2} \\[2mm] F = \lambda An_0^2\sin\theta_0\cos\theta_0. \end{cases} \qquad (57)$$

F is always greater than zero.

If $dk/d\lambda < 0$, $D > 0$, $\Delta\phi_0$ and $\Delta\lambda$ will have the same sign. In other words, by increasing $\phi_0$, the cut-off wavelength will shift towards a longer wavelength.

If $dk/d\lambda > 0$, it follows from equation (54) that $D < 0$, therefore $\Delta\phi_0$ and $\Delta\lambda$ have the opposite sign. In other words, by increasing $\phi_0$, the cut-off wavelength will shift towards a shorter wavelength.

How to Sharpen the Transition

The sharpness of the transition is proportional to $\partial\beta/\partial\lambda$ at the transition or cut-off wavelength. The larger the absolute value of $\partial\beta/\partial\lambda$, the sharper the transition will be. From equation (53), we obtain:

$$\frac{\partial\beta}{\partial\lambda} = \beta\left(\frac{1}{2A}\frac{dA}{d\lambda} - \frac{1}{\lambda}\right) = \beta f(\theta_0,\lambda). \qquad (58)$$

Therefore, $\Delta(\partial\beta/\partial\lambda)$ can be written as:

$$\Delta\left(\frac{\partial\beta}{\partial\lambda}\right) = \beta\Delta f + f\Delta\beta. \tag{59}$$

Since $\Delta\beta$ is zero at the transition or cut-off wavelength, therefore, $$\begin{cases} \Delta\left(\frac{\partial\beta}{\partial\lambda}\right) = \beta\Delta f \\ = \beta\left(\frac{A\Delta\left(\frac{dA}{d\lambda}\right) - \frac{dA}{d\lambda}\Delta A}{2A^2} + \frac{\Delta\lambda}{\lambda^2}\right) \\ = \beta\left(\frac{\Delta\left(\frac{dA}{d\lambda}\right)}{2A} - \frac{\frac{dA}{d\lambda}\Delta A}{2A^2} + \frac{\Delta\lambda}{\lambda^2}\right) \\ = g\beta \end{cases} \tag{60}$$

where $$g = \frac{\Delta\left(\frac{dA}{d\lambda}\right)}{2A} - \frac{\frac{dA}{d\lambda}\Delta A}{2A^2} + \frac{\Delta\lambda}{\lambda^2}, \tag{61}$$

$$\begin{cases} \Delta A = -\Delta B + \frac{B\Delta B + C\Delta C}{\sqrt{B^2+C^2}} = \frac{-(-B+\sqrt{B^2+C^2})\Delta B + C\Delta C}{\sqrt{B^2+C^2}} = \frac{-A\Delta B + C\Delta C}{\sqrt{B^2+C^2}} \\ = \frac{2(kA+nC)\frac{dk}{d\lambda}\Delta\lambda + 2An_0^2\sin\theta_0\cos\theta_0\Delta\theta_0}{\sqrt{B^2+C^2}} \\ = 2\left[(1-A)(kA+nC)\frac{dk}{d\lambda} + \frac{A^2\sqrt{B^2+C^2}}{\lambda}\right]\Delta\lambda \\ \Delta B = -2k\frac{dk}{d\lambda}\Delta\lambda - 2n_0^2\sin\theta_0\cos\theta_0\Delta\theta_0 \\ = -2k\frac{dk}{d\lambda}\Delta\lambda - 2\frac{-(kA+nC)\lambda\frac{dk}{d\lambda} + A\sqrt{B^2+C^2}}{\lambda}\Delta\lambda \\ = 2\left[-(1-A)k + nC)\frac{dk}{d\lambda} - \frac{A\sqrt{B^2+C^2}}{\lambda}\right]\Delta\lambda \\ \Delta C = 2n\frac{dk}{d\lambda}\Delta\lambda \end{cases} \tag{62}$$

$$\begin{cases} \Delta\left(\frac{dA}{d\lambda}\right) = 2\frac{\sqrt{B^2+C^2}\left[(kA+nC)\frac{d^2k}{d\lambda^2}\Delta\lambda + \left(k\Delta A + A\frac{dk}{d\lambda}\Delta\lambda + n\Delta C\right)\frac{dk}{d\lambda}\right] - (kA+nC)\left(\frac{B\Delta B + C\Delta C}{\sqrt{B^2+C^2}}\right)\frac{dk}{d\lambda}}{B^2+C^2}. \end{cases} \tag{63}$$

The relationship between $\Delta\phi_0$ and $\Delta\lambda$ is defined by Equation (56).

Therefore, the sharpness of the transition as a function of angle of incidence will depend on the value of g. Under some conditions, the sharpness may increase with the angle of incidence. Under other conditions, the sharpness may decrease with the angle of incidence.

Although in above discussions, the transition is caused by either $dn/d\lambda$ or $dk/d\lambda$, in practice, both effects can be used in the design of a cut-off filter. For example, in the ITO case, at lower angles of incidence, the $dk/d\lambda$ is the dominated factor, at higher angles of incidence, the $dn/d\lambda$ is the dominated factor.

Optical Constants of ITO Films

Figure 4:
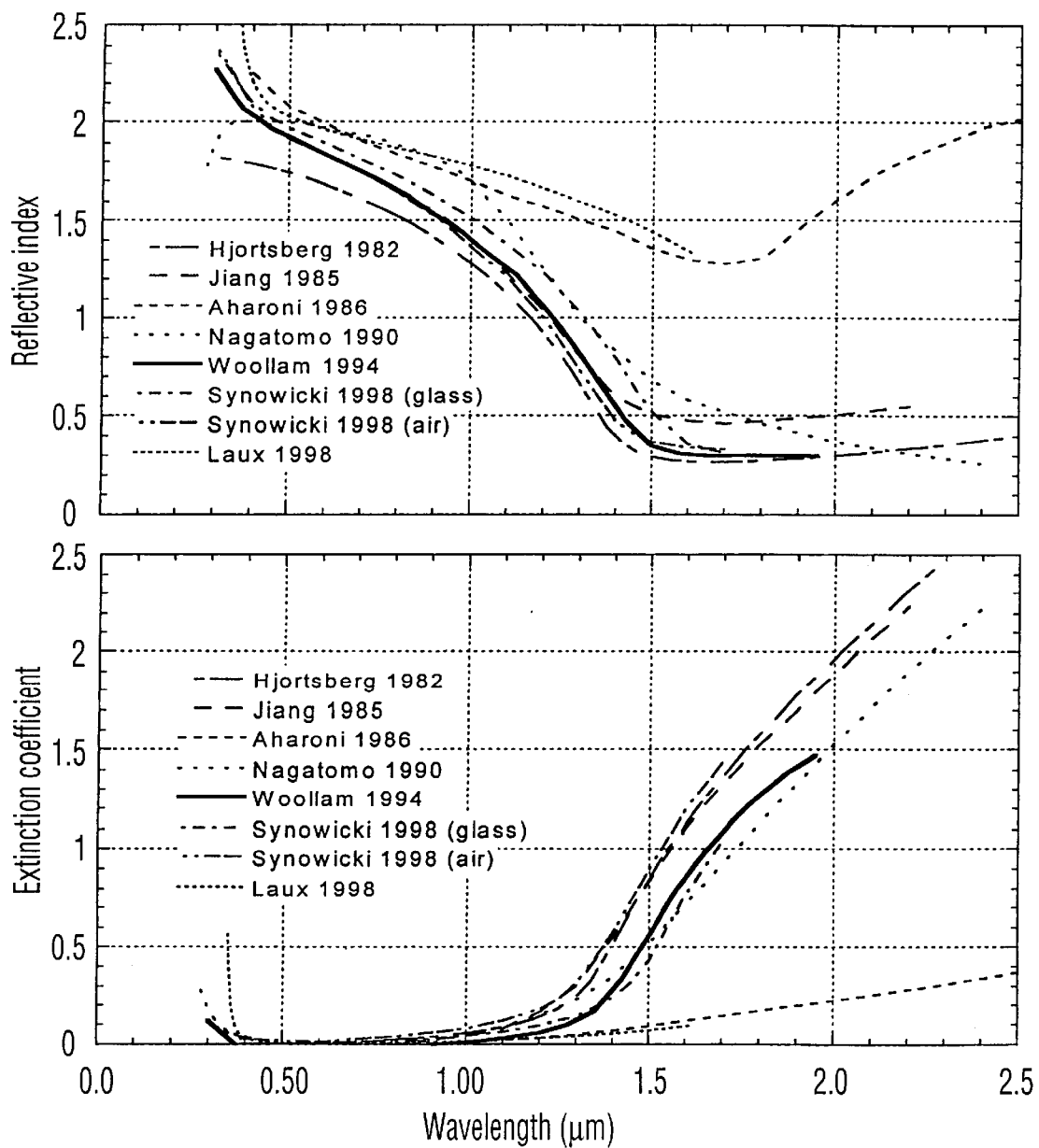
FIG. 4 shows some experimentally measured optical constants of ITO that have been published in the literature. The layer described by Synowicki was inhomogeneous and constants are presented here that correspond to the layer at the substrate and air interfaces.

Although many publications dealing with ITO films have been published in the past, only a few of these present experimental data on the optical constants of this material. Even fewer give values for the whole range of wavelengths required for the present invention. In FIG. 4 are shown some of the experimentally determined optical constants of ITO that have been published previously. In the original publications the data was presented in terms of n and k, or of $\epsilon 1$ and $\epsilon 2$, on a wavelength, wavenumber or eV scale. In other instances the results were in the form of dispersion equations. For easy comparison, it is first necessary to convert the data into a common form. It will be seen from FIG. 4 that there are significant differences between the values cited by different researchers. However, it is well known that the optical constants of ITO films depend critically on the starting materials as well as on the parameters of the deposition process, all of which affect the free carrier concentration. Further, the layers are often inhomogeneous and their properties are affected by post-deposition treatment.

Optical Behavior of ITO Films

Figure 5:
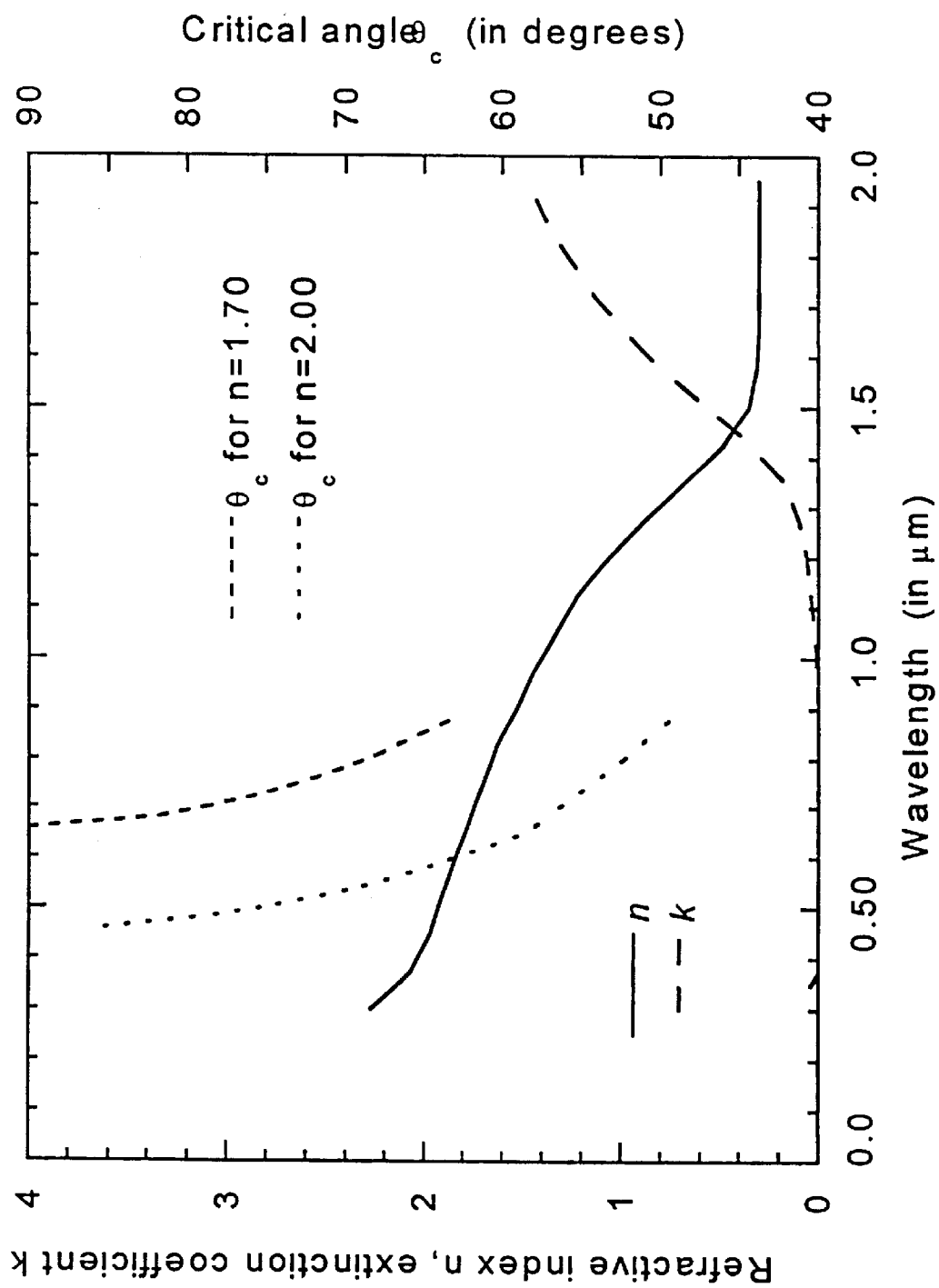
FIG. 5 shows the optical constants of ITO that were used in the calculations plotted for the 0.4 to 2.0 μm spectral region. Also shown are the critical angles when a film of this material is embedded between glass of index $n_0$=1.70 and 2.0.

The calculated performance of single ITO films embedded between prisms of refractive index $n_0$=1.45, 1.70 and 2.00 is compared with the results predicted by the equations developed for the four special cases described above. FIG. 5 shows the optical constants in the 0.4–2.0 μm spectral region used for the ITO film used in the calculations. Also shown in the same diagram are the critical angles as a function of wavelength for the cases when the layers are embedded between glass of refractive indices 1.70 and 2.00. These curves were calculated from Equation (31) for the spectral region in which the ITO layer does not absorb. As already mentioned, there are no critical angles in the non-absorbing region when $n_0$=1.45.

Figure 6:
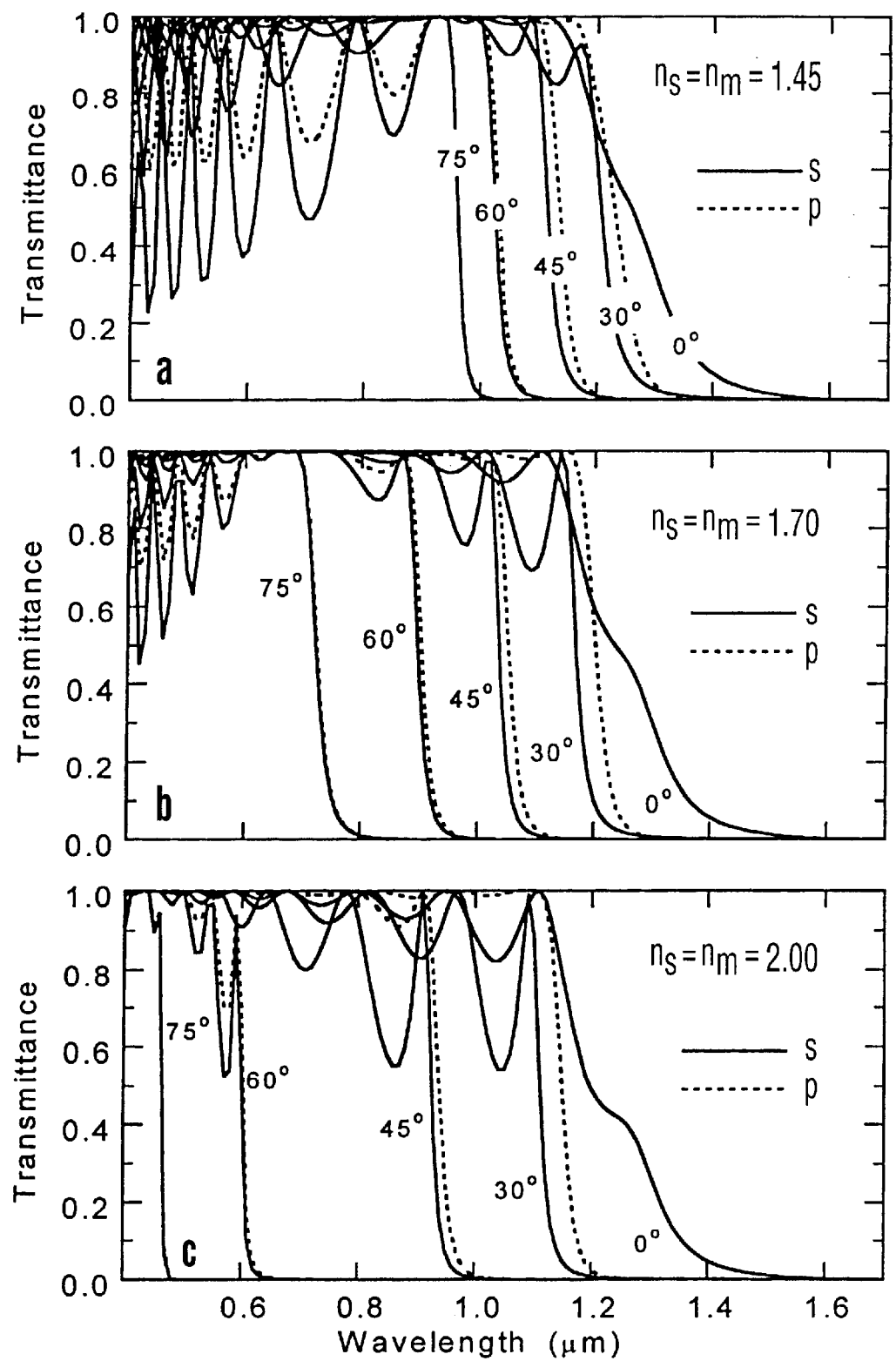
FIG. 6 shows the transmittance for s- and p-polarized light of a 1 μm thick ITO layer embedded between prisms of refractive index (a) 1.45, (b) 1.70 and (d) 2.00, respectively. Curves are given for light incident at 0°, 30°, 45°, 60° and 75°.

FIG. 6 illustrates the calculated dependence of the transmittance of a 1.0 μm thick ITO layer on angle and prism index. The curves plotted are calculated transmittances for s- and p-polarized light for angles of incidence of 0°, 30°, 45°, 60° and 75°. FIGS. 9a, 9b and 9c correspond to the cases in which the ITO layer is embedded between prisms of refractive indices 1.48, 1.70 and 2.00, respectively. A number of general observations can be made on the basis of this diagram.

The behavior of the ITO film in the transmission region can be predicted and explained by the equations of Section II 2a. The refractive index of the ITO film has values of 1.45, 1.70 and 2.00 at approximately 0.92, 0.66 and 0.45 μm, respectively in the transmission region in which k=0. For substrates of refractive index 1.45, 1.70 and 2.00 the transmittance for both s- and p-polarized light should therefore be equal to 1 at these wavelengths. The calculated spectral transmittance curves confirm these predictions (FIG. 6). In other parts of the transmission region where there is a difference between the refractive indices of the ITO film and of the substrate, some oscillations in the transmittance are observed. The amplitudes of the oscillations increase with the difference in the refractive indices and also with the angles of incidence. Moreover, the oscillations have different values for s- and p-polarized light. The difference at higher angles between the admittances $\eta$, $\eta_0$ is accentuated by the cosine terms in Equations (15). Later, it will be shown how the oscillations can be removed by adding some extra layers.

The position of the cut-off edge in the transition region can be explained by the equations of Sections II 2c and 2d. The cut-off wavelength does not materially depend on the substrate index for light incident at 0°. However, for other angles of incidence, it is shifted towards shorter wavelengths with increasing angle. The sharpness of the transition from transmission to rejection increases with the angle of incidence.

FIG. 6a corresponds to the case in which the refractive index of the substrate is lower than that of the ITO layer. For this case there is no critical angle (FIG. 7) and the cut-off wavelength depends entirely on the extinction coefficient of the ITO. It cannot be shorter than 0.9 μm, the wavelength at which the extinction coefficient assumes non-zero values. Of course, the transmittance decreases with increase of the extinction coefficient and the faster this increase with wavelength, the sharper the cut-off edge. The effective absorption factor β increases with angle of incidence and so the cut-off edge shifts towards shorter wavelengths and the transition becomes sharper. As predicted by the equations of Section II 2c, the splitting of the cut-off edge for s- and p-polarized light first increases (30°, 45°) from the normal incidence zero value and then decreases due to the increase of β as the angle of incidence becomes large (60°, 75°).

FIGS. 6b, 6c correspond to the cases in which the ITO layers are embedded between prisms of refractive indices 1.70, 2.00. The corresponding smallest values of the critical angles are 63°, 49° (Equation 31, FIG. 5) and they occur at 0.9 μm, the wavelength at which the ITO layers become transparent. When the angles of incidence are smaller than the critical angle, the cut-off edges occur at wavelengths greater than 0.9 μm and they depend completely on the extinction coefficient k (FIGS. 6b and 6c, 30°, 45°). As in the example of FIG. 6a, the optical performance of the ITO film can be explained by the equations of Section II 2c. However, once the angles of incidence exceed the critical angle, the cut-offs occur at shorter wavelengths and they are entirely due to the critical angle effect (FIGS. 6b and 6c, 60°, 75°).

In the visible and near IR part of the spectrum the refractive indices of ITO films decrease with wavelength (FIG. 5). This causes the critical angle to decrease and the reflectance R to increase with wavelength. The faster the decrease in n, the sharper the cut-off edge. With increase in the angle of incidence, R becomes larger and T smaller. As a result the cut-off edge shifts towards shorter wavelengths. Note also that because β is very large, the cut-off edges do not show any significant polarization splitting. This too can be predicted from the equations of Section II 2d.

In the rejection region, at wavelengths greater than 1.6 μm where the extinction coefficient of ITO is high, the reflectance is high and the transmittance is low, as predicted by the arguments of Section II 2b. This applies to all parts of FIG. 6. In the last two examples (1.70, 2.00), when the angles of incidence are larger than the critical angle, the rejection region adjacent to the cut-off edge is caused by the total internal reflection. Here, as the angle increases, R can reach unity.

Figure 7:
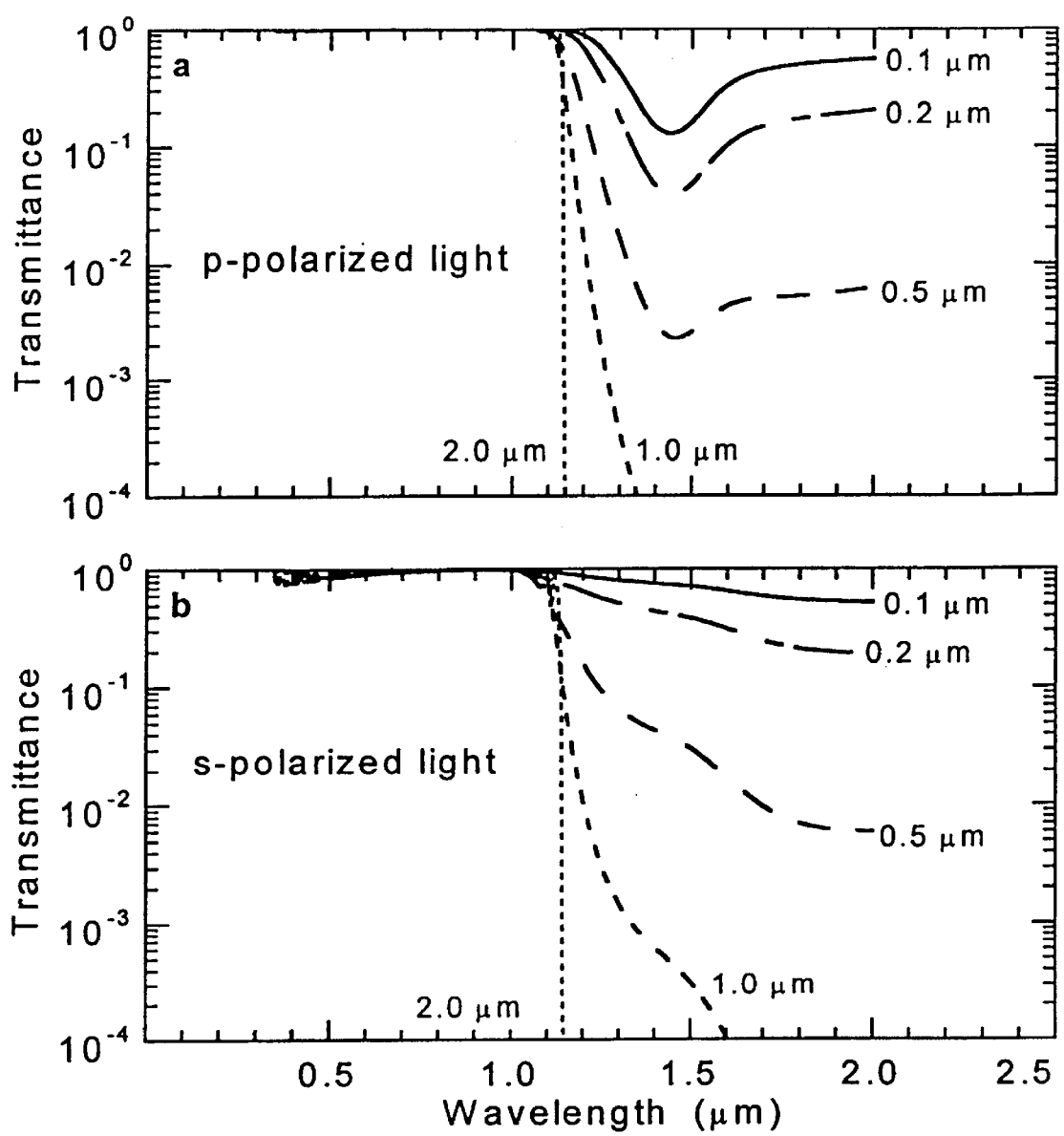
FIG. 7 shows the effect of metric thickness of the ITO layer on the cut-off for light polarized parallel (a) and perpendicular (b) to the plane of incidence. The layers are embedded between 45° prisms of refractive index 1.70.

The effect of thickness of the ITO layer on the sharpness of the transition from transmission to rejection for p-polarized and s-polarized light is investigated in FIG. 7. The ITO film was assumed to be embedded between two 45° prisms of refractive index 1.70. The transmittance in these diagrams is plotted on a logarithmic scale to better show the attenuation that is possible with the various thicknesses and its variation with the polarization of the incident light. The curves correspond to films of metric thicknesses 0.1, 0.2, 0.5, 1.0 and 2.0 μm. It will be seen from these diagrams that the attenuation is more rapid for p-polarized light. A very good cut-off edge can be obtained with thicknesses of ITO greater than 1.0 μm. Note also that the polarization splitting decreases with increase in thickness of the ITO layers. These results are in good agreement with the theory presented in Section 2c.

Long Wavelength Cut-off Filters Designed for 45° and 60° Incidence

Results of the type shown in FIGS. 6, 7 are useful during the design of cut-off filters for the 0.5 to 1.2 μm spectral region that are based on ITO films embedded between two glass prisms. First, the thickness of the layer required to achieve a certain sharpness of the transition from transmission to rejection can be estimated from FIG. 7. FIG. 6 shows the cut-off wavelengths that can be achieved with prisms of different refractive indices. Once the prism material has been selected, it is possible to obtain an estimate of the required angle of incidence to obtain the cut-off wavelength. Lastly, in order to obtain a decent cut-off filter, it is necessary to remove the ripples that occur in the transmission region. This can be readily done through the design of suitable antireflection layers. Excellent results can be achieved through the use of layers of one or two additional coating materials without an undue increase in the overall thickness of the system. Various ways exist for the design of such coatings. The method employed in the design of the following two examples was a numerical needle method with refinement of the layer thicknesses.

In FIG. 8a are shown the transmittances for p- and s-polarized light and the refractive index profile expressed in terms of the optical thickness in μm of a 15-layer system designed for use between two 45° prisms of refractive index 1.70. The cut-off wavelength occurs at 1.054 μm. The coating materials used in this design are ITO and $Nb_2O_5$ and the overall metric thickness Σd of this system is 1.92 μm. It will be seen that the ripple in the transmittance band has been effectively removed. Such a system should be easy to manufacture since only a few layers and only two materials are used. The corresponding results for a 2.25 μm thick 13-layer three-material system based on ITO, $Nb_2O_5$ and $SiO_2$ and designed for use with a 60° angle of incidence are shown in FIG. 8b. The transition between the transmission and rejection regions of this filter occurs at 0.91 μm. This too is a very simple design compared to the multilayer structures required to achieve a similar blocking in the infrared by conventional means. These calculated results were obtained with the thin film design program TFDesign.

Angular Performance of the Cut-off Filters

It has be en stat ed above that the cut-off wavelength of filters based on ITO films can be tuned by changing the angle of incidence. However, for the filter to be useful, it is necessary to show that the performance is sufficiently constant with smaller variations of the angle of incidence.

Figure 9:
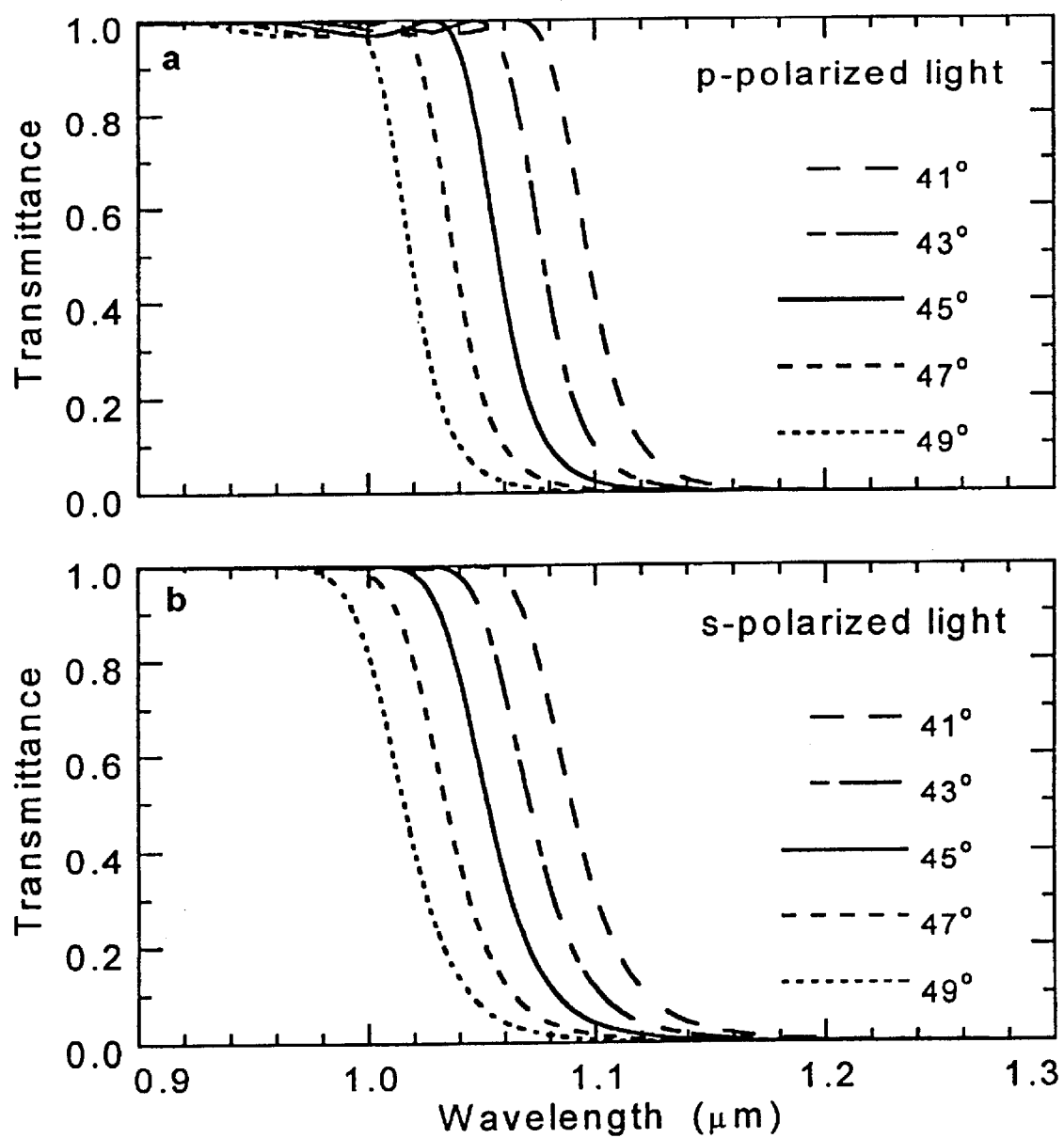
FIG. 9 shows the effect of the angle of incidence measured in glass on the position of the cut-off for (a) p- and (b) s-polarized light for the filter of FIG. 8a. Note the greatly expanded x-axis.

In parts a and b of FIG. 9 are shown the calculated spectral transmittances for p- and s-polarized light of the cut-off filter of FIG. 5a for light incident at 41°, 43°, 45°, 47° and 49° measured in glass. This corresponds to an angular field of about 14° in air. Note that the wavelength axis has been greatly expanded in this diagram. It will be seen that the main effect of an increase in the angle of incidence is a displacement of the transmittance curve towards shorter wavelengths. For this range of angles the change in the cut-off from the design wavelength is of the order of ±4%. This should be acceptable for most applications.

Producibility of the Filters

The last aspect that needs to be investigated is the producibility of such filters. In the present type of filter the cut-off is achieved mainly through the use of absorption or the critical angle, both of which completely depend on the dispersion of the optical constants of the ITO films and of the substrates. Absorption is the main blocking effect beyond the cut-off wavelength, but at the transition total internal reflection is used to bring about a sharp cut-off. One would therefore expect the performance of the filters above the cut-off wavelength to be insensitive to errors in the thicknesses of the layers, unlike the situation that exists for the more usual multilayer designs that are based on thin film interference in non-absorbing layers.

Figure 10:
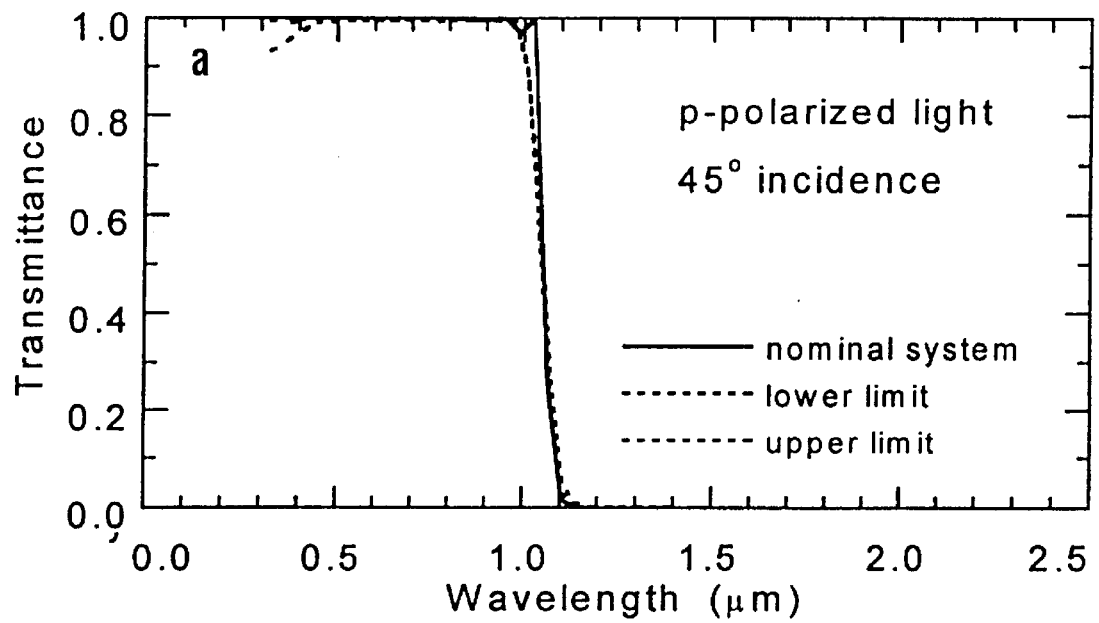
FIG. 10 shows the effect of 20% random errors in layer thicknesses on the performance the filter of FIG. 8a for p- and (b) s-polarized light.
Figure 10:
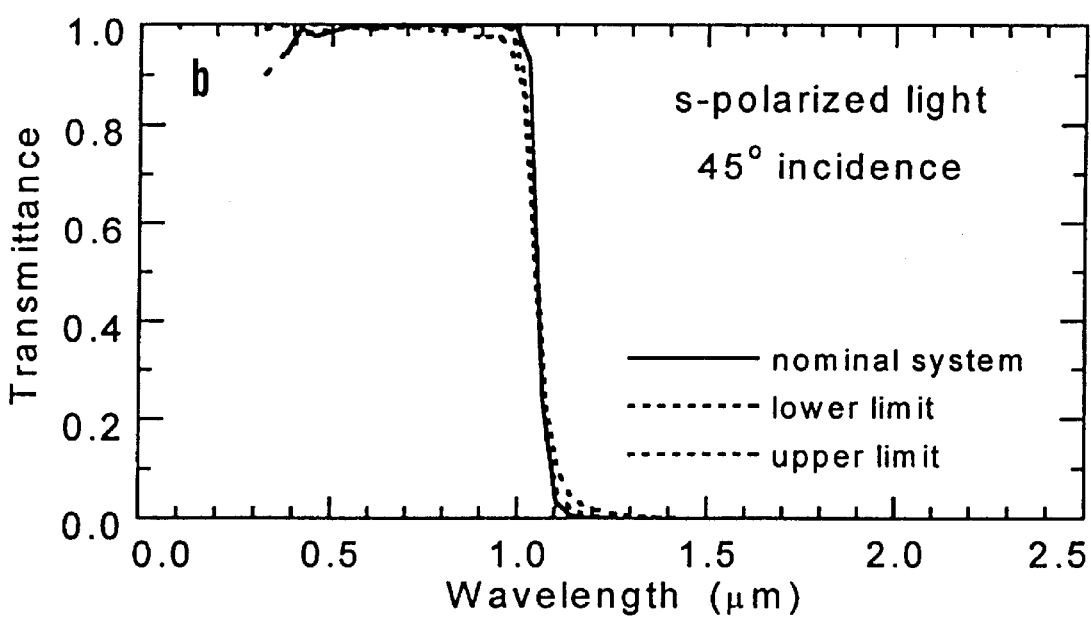

This has been born out by numerical calculations. FIGS. 10a, 10b show, for the filter of FIG. 8a, the upper and lower limits within which one would expect the measured transmittances for p- and s-polarized light to lie for 66% of the filters produced with a 20% random variation in the thicknesses of the individual layers. Clearly even in the transmission region such very large errors in the thicknesses of the layers have very little effect on the performance of this type of a multilayer structure. Film thickness control will therefore not be an issue in the manufacture of the filters.

Calculations of the spectral transmittances for p- and s-polarized light were performed for the same multilayer to investigate its sensitivity to changes in the optical constants of ITO. In a first set of calculations all the refractive index and extinction coefficient values were multiplied by factors of 0.8, 1.0 and 1.2, respectively. As

TABLE 1

Optical constants of ITO used in calculations

| ITO (Woollam et al) | | | ITO (Nagamoto et al) | | |
|---|---|---|---|---|---|
| λ (mm) | n | k | λ (mm) | n | k |
| 0.300 | 2.27 | 0.12 | 0.300 | 1.90 | 0.18 |
| 0.375 | 2.07 | 0.00 | 0.320 | 1.96 | 0.12 |
| 0.450 | 1.97 | 0.00 | 0.340 | 1.99 | 0.09 |

TABLE 1-continued

Optical constants of ITO used in calculations

| ITO (Woollam et al) | | | ITO (Nagamoto et al) | | |
|---|---|---|---|---|---|
| λ (mm) | n | k | λ (mm) | n | k |
| 0.525 | 1.91 | 0.00 | 0.360 | 2.00 | 0.05 |
| 0.600 | 1.84 | 0.00 | 0.380 | 2.00 | 0.03 |
| 0.675 | 1.77 | 0.00 | 0.400 | 2.00 | 0.03 |
| 0.750 | 1.70 | 0.00 | 0.420 | 2.00 | 0.01 |
| 0.825 | 1.63 | 0.00 | 0.440 | 2.00 | 0.00 |
| 0.900 | 1.53 | 0.00 | 0.460 | 2.00 | 0.00 |
| 0.975 | 1.44 | 0.01 | 0.480 | 2.00 | 0.00 |
| 1.050 | 1.33 | 0.02 | 0.500 | 2.00 | 0.00 |
| 1.125 | 1.22 | 0.04 | 0.550 | 1.99 | 0.00 |
| 1.200 | 1.06 | 0.06 | 0.600 | 1.97 | 0.00 |
| 1.275 | 0.88 | 0.10 | 0.650 | 1.95 | 0.00 |
| 1.350 | 0.68 | 0.17 | 0.700 | 1.94 | 0.00 |
| 1.425 | 0.48 | 0.34 | 0.750 | 1.92 | 0.00 |
| 1.500 | 0.35 | 0.56 | 0.800 | 1.89 | 0.00 |
| 1.575 | 0.31 | 0.80 | 0.850 | 1.86 | 0.01 |
| 1.650 | 0.30 | 0.98 | 0.900 | 1.82 | 0.02 |
| 1.725 | 0.30 | 1.14 | 0.950 | 1.77 | 0.03 |
| 1.800 | 0.30 | 1.27 | 1.000 | 1.70 | 0.05 |
| 1.875 | 0.30 | 1.39 | 1.100 | 1.50 | 0.09 |
| 1.950 | 0.30 | 1.47 | 1.200 | 1.25 | 0.15 |
| | | | 1.300 | 1.00 | 0.23 |
| | | | 1.400 | 0.83 | 0.35 |
| | | | 1.500 | 0.68 | 0.52 |
| | | | 1.600 | 0.58 | 0.72 |
| | | | 1.800 | 0.46 | 1.13 |
| | | | 2.000 | 0.37 | 1.53 |
| | | | 2.200 | 0.31 | 1.90 | expected, it was found that, for this kind of a change in the optical constants, the shape of the cut-offs are essentially unchanged, but that their positions on the wavelength scale were displaced by the same amount.

Figure 11:
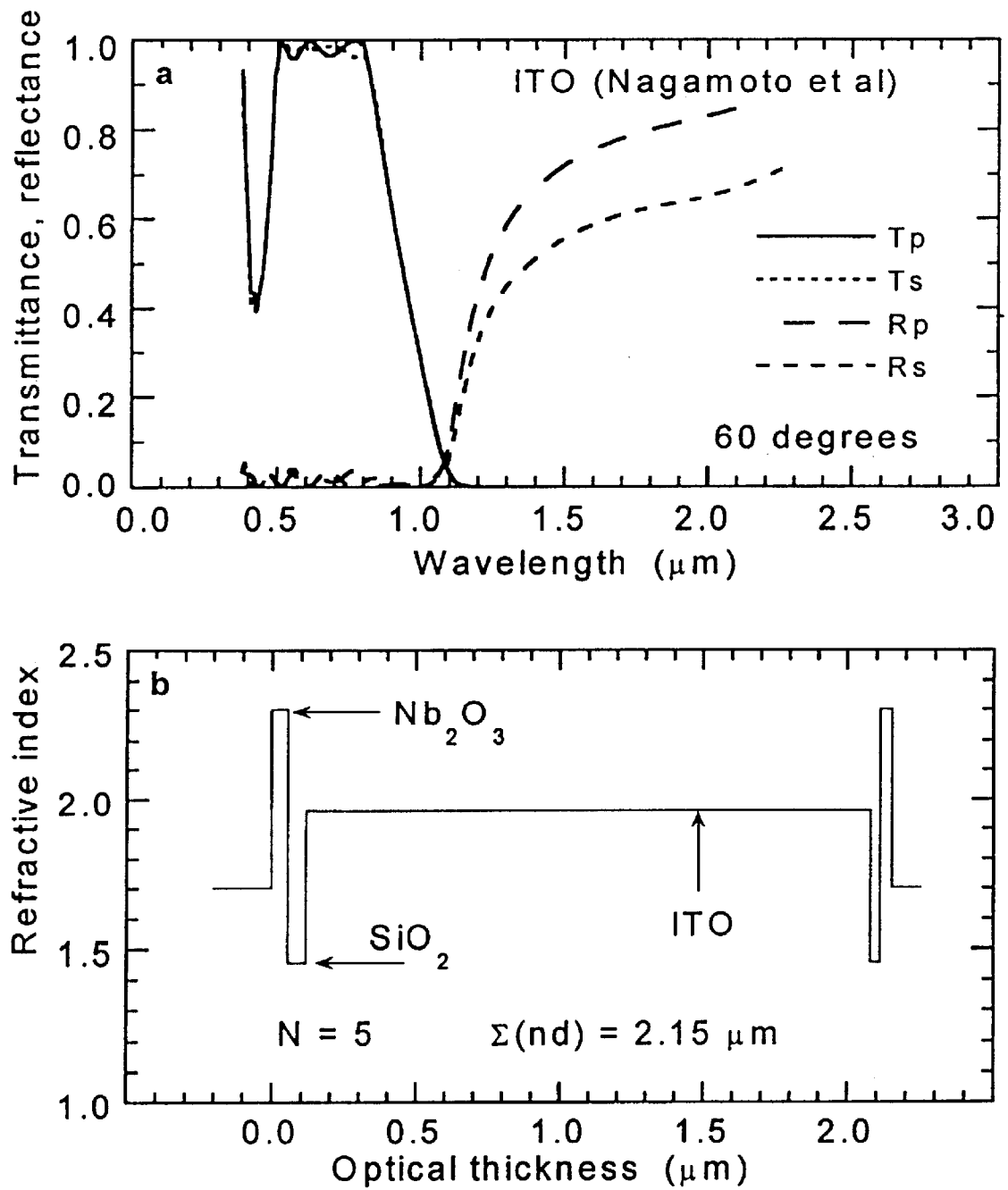
FIG. 11 shows the calculated performance and refractive index profile of a long wavelength cut-off filter based on the use of ITO films with optical constants presented in columns 4–6, Table 1. The multilayer is embedded between $SiO_2$ prisms and has been designed for a 60° angle of incidence.

It was thought that the spectral performance of the multilayer would be much more sensitive to changes in which the refractive indices and the extinction coefficients vary independently. It follows from the experimentally determined optical constants shown in FIG. 4 that it is reasonable to expect such variations. To investigate this problem, a cut-off filter was designed using the optical constants found for one of the films mentioned in Section III, above. The actual values of n and k used in the calculations are given in columns 4–6, Table 1. The performance and the refractive index profile of a 9-layer system based on this material with a cut-off at 1.5 μm are shown in FIGS. 11a, 11b, respectively. It will be seen that the transition from transmission to rejection is much more gradual due to the less rapid variation in the refractive index.

Various other embodiments include a two material design wherein said functional core wherein said functional core consists of multiple alternate layers in a two-material system. The alternate layers may be indium tin oxide and a material selected from a group consisting of $Nb_2O_5$, $TiO_2$, $ZrO_2$, ZnS, ZnSe, $Ta_2O_5$, Ge, Si. Alternatively, a three material system may be employed in which wherein said functional core consists of multiple alternate layers in a three-material system. In this case, the alternate layers may be indium tin oxide, a high index material selected from a group consisting of Nb2O5, TiO2, ZrO2, ZnS, ZnSe, $Ta_2O_5$, Ge, Si, and a low index material selected from a group consisting of $SiO_2$, $MgF_2$, $CaF_2$, $Al_2O_3$.

The filters made in accordance with the principles of the invention will be more bulky than the prior art. It is, however, possible to reduce the bulkiness and weight of the device through the use of several smaller, adjacent prisms 20 as shown in FIG. 1b. Some of the rejected light is returned in the general direction of the light source. This may, or may not be a disadvantage.

Further economies in space or weight can be achieved if the prisms of FIGS. 1a, 1b are replaced by micro-prism sheets 30, 32 of the type depicted in FIGS. 1c, 1d. The layer systems are deposited onto prismatic sheets that have been extruded or cast from a high refractive index plastic or sintered under pressure from an inorganic powder. Identical prismatic sheets are then cemented onto coated surfaces, as shown in FIGS. 1c, 1d. However, it should be remembered that plastic substrates cannot be annealed or subjected to high temperatures during the deposition process. For the implementation of this type of a solution, the ITO layers would therefore have to be deposited by an energetic deposition process to obtain films with good properties.

The sheets can either have the microprisms formed on the outside, with a planar core layer, or on the inside, with a zig-zag core layer, as shown in FIG. 1d.

The use of cements and contact liquids to bond optical components is cheap and standard practice in all but the highest energy applications. However, it may impose an upper limit on the refractive indices of the surrounding media that can be used in the design if thick layers of the cement are to be used at a multilayer/prism interface. Although some optical contact liquids can have a refractive index as high as 2.2, they are unstable and are sometimes toxic. Optical cements are preferred for more permanent applications. However, their refractive indices are usually below 1.60. One solution for prisms made of higher index materials would be to optically contact the two components. However, optical contacting requires high quality surfaces that are more expensive to produce, especially in larger sizes. There is a cheaper, alternative solution. The designs presented above are symmetrical. It is possible to deposit one half of the layer system onto each of two prisms having reasonably flat surfaces. The two components can then be cemented together or just held in intimate contact. Calculations have shown that, as long as the optical thickness of the gap between the two components is less than one or two hundred angstroms, the performance of the device will be virtually unchanged from the performance without a gap. This is true for any refractive index of the gap that lies between 1.0 and 4.0. However, for an optical cement with an index that is close to that of the ITO layer, the thickness of the gap can be appreciably larger, thus relaxing the tolerance on the required flatness of the prism faces.

The calculations given so far have been concerned with filters based on the use of ITO. In addition to the materials mentioned in the introduction, there exist many other materials with similar properties in adjacent or other spectral regions that could be utilized to produce this type of filter. Reststrahlen materials are one such class of materials suitable for use in the infrared part of the spectrum. Such materials include materials are selected from the group consisting of $Al_2O_3$, AlN, BeO, $CaF_2$, CdS, CsI, LiF, MgO, NaF, SiC, $SiO_2$, $TiO_2$, $ThO_2$, ZnO, ZnSe.

Figure 12:
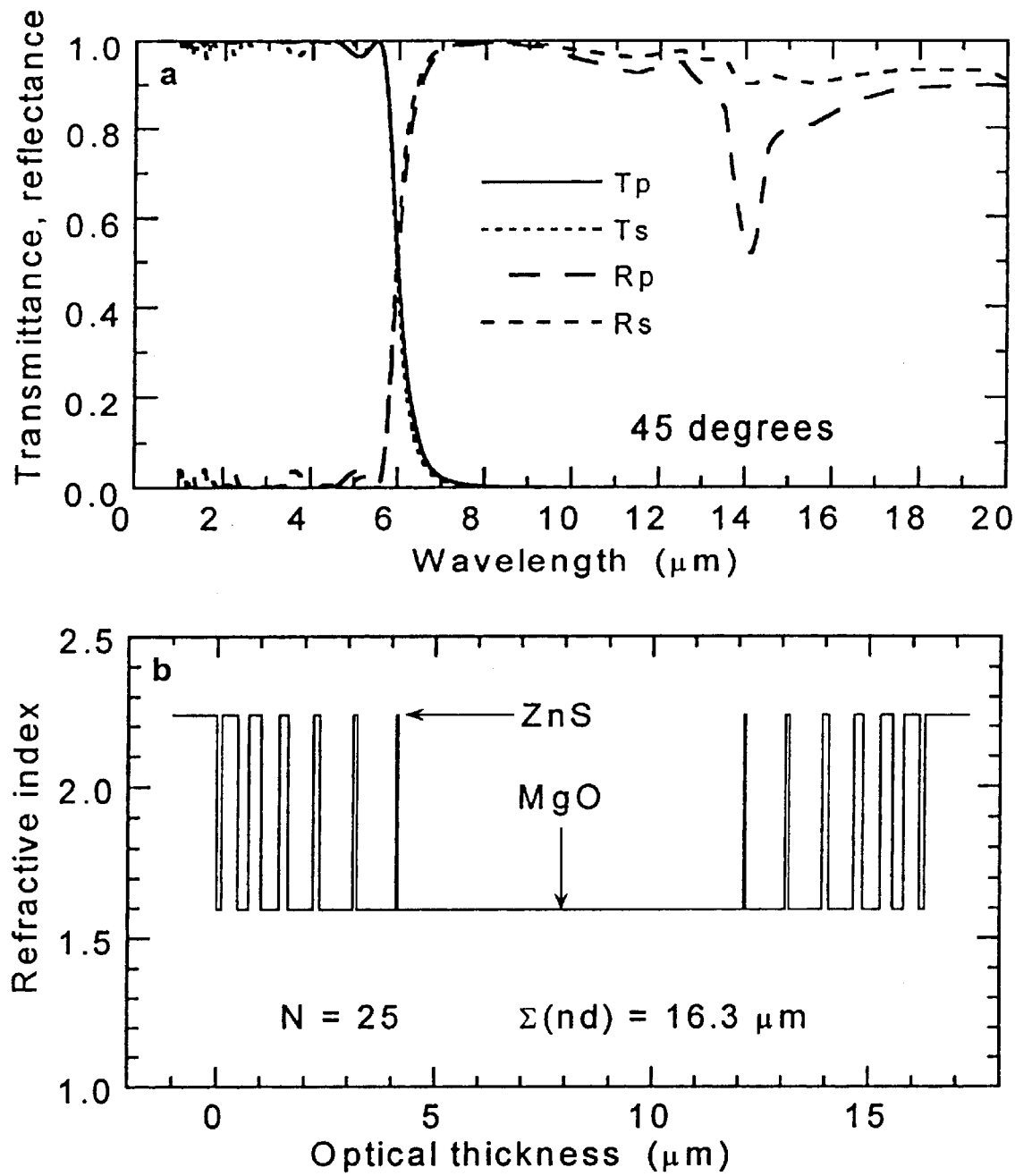
FIG. 12 shows the calculated performance and refractive index profile of a long wavelength cut-off filter based on the use of MgO and ZnS films. The multilayer is embedded between ZnS prisms and has been designed for a 45° angle of incidence. (See text for more details).

FIG. 12 shows the calculated performance of a 25-layer cut-off filter of symmetrical construction that is based on the use of ZnS and MgO coating materials. It has been assumed that the prisms are made of Irtran 2 or a similar material. The filter has a high transmittance in the 1.0 to 6.0 $\mu$m spectral region and rejects the radiation of up to about 40 $\mu$m. The number of thin layers that form the antireflection coatings between the thick MgO layer and the prisms can be reduced or increased: this will result in a larger or smaller ripple in the transmission region, respectively. The optical constants of ZnS and MgO used in the calculations were taken from Palik's books. Unlike ITO, these and most other Reststrahlen materials have very well defined and reproducible optical constants.

If materials were to be found that have optical constants that are similar to those shown in FIG. 8 except for being flipped with respect to a vertical axis, it would be possible to design short wavelength cut-off filters based on the same principle.

It is quite likely that, in addition to many scientific applications, filters of this type may find mass applications. For example, they may be useful in the conversion of heat to electricity based on thermo-photovoltaic cells. Because of the limited band gap of photovoltaic materials, the cells can utilize only a small part of the incident radiation. A large amount of infrared radiation is lost. To increase the conversion efficiency, the unused infrared radiation could be sent back towards the thermal emitter to raise its temperature. For this, filters are required that freely transmit radiation in the working wavelength region of the photovoltaic cells and that strongly reflect radiation of higher wavelengths. It is evident from FIGS. 2b and 2c that the reflectance of the type of filter described in this paper is especially high on the long wavelength side of the cut-off when it is operating at angles close to- or greater than the critical angle. The energy conversion efficiency of thermo-photovoltaic converters could therefore be increased by using such filters in the configurations depicted in FIGS. 1b, 1d.

The described filters offer improved cut-off properties, especially at long wavelengths.

We claim:

1. An optical filter with a sharp cut-off at a predetermined wavelength $\lambda$, comprising:

a pair of optical media respectively defining an inlet port and an outlet port and having an inclined interface such that a light beam passing between said inlet and outlet ports strikes said interface at a non-normal angle of incidence $\alpha$;

a functional core comprising at least one material sandwiched between said optical media at said interface, said functional core having a complex refractive index of the form n−ik, wherein n and k are optical constants, n being the real refractive index, k being the extinction coefficient, and wherein the real refractive index n is highly dispersive in one wavelength region, and the extinction coefficient k is highly dispersive in another wavelength region adjacent said one wavelength region, said extinction coefficient having a high value on the cut-off side of said predetermined wavelength; and wherein said angle of incidence $\alpha$ is selected such that light at said predetermined wavelength strikes said interface at a critical angle whereby total internal reflection at said predetermined wavelength occurs in said functional core and on the cut-off side of said predetermined wavelength transmission is inhibited by a high value of said extinction coefficient.

2. A cut-off filter as claimed in claim 1, said functional core includes at least one anti-reflective coating to reduce ripples on the transmission side.

3. A cut-off filter as claimed in claim 2, wherein said optical media have the same refractive index.

4. A cut-off filter as claimed in claim 3, wherein said refractive index is about 1.7.

5. A cut-off filter as claimed in claim 1, wherein said optical media are prisms having a facet cut to ensure said non-normal angle of incidence at said interface.

6. A cut-off filter as claimed in claim 5, comprising a plurality of said prisms arranged side by side with the interfaces arranged in a zig-zag arrangement.

7. A cut-off filter as claimed in claim 1, wherein said functional core is selected from the group consisting of: transparent conducting materials and Reststrahlen materials.

8. A cut-off filter as claimed in claim 7, wherein said transparent conducting materials are selected from the group consisting of indium tin oxide (ITO), doped tin oxide, cadmium tin oxide, and said Reststrahlen materials are selected from the group consisting of $Al_2O_3$, AlN, BeO, $CaF_2$, CdS, CsI, LiF, MgO, NaF, SiC, $SiO_2$, $TiO_2$, $ThO_2$, ZnO, ZnSe.

9. A cut-off filter as claimed in claim 1, wherein said extinction coefficient is high on the long wavelength side of the said sharp cut-off filter, said cut-off filter providing a long wavelength cut-off filter.

10. A cut-off filter as claimed in claim 1, wherein said functional core consists of multiple alternate layers in a two-material system.

11. A cut-off filter as claimed in claim 10, wherein said alternate layers are indium tin oxide and a material selected from a group consisting of $Nb_2O_5$, $TiO_2$, $ZrO_2$, ZnS, ZnSe, $Ta_2O_5$, Ge, Si.

12. A cut-off filter as claimed in claim 1, wherein said functional core consists of multiple alternate layers in a three-material system.

13. A cut-off filter as claimed in claim 12, wherein said alternate layers are indium tin oxide, a high index material selected from a group consisting of $Nb_2O_5$, $TiO_2$, $ZrO_2$, ZnS, ZnSe, $Ta_2O_5$, Ge, Si, and a low index material selected from a group consisting of $SiO_2$, $MgF_2$, $CaF_2$, $Al_2O_3$.

14. A cut-off filter as claimed in claim 1, wherein said optical media comprise microprismatic sheets.

15. A cut-off filter as claimed in claim 14, wherein said microprismatic sheets have microprisms located on their outside faces and said functional core lying in plane between said sheets.

16. A cut-off filter as claimed in claim 14, wherein said microprismatic sheets have microprisms located on their inside faces and said functional core forms a zig-zag pattern between said sheets.

17. A method of filtering light, comprising:

providing a functional core sandwiched between a pair of optical media respectively defining an inlet port and an outlet port and having an inclined interface such that a light beam passing between said inlet and outlet ports strikes said interface at a non-normal angle of incidence α, said functional core comprising at least one material sandwiched between said optical media at said interface and having a complex refractive index of the form n−ik wherein n and k are optical constants, n being the real refractive index, k being the extinction coefficient, and wherein the real refractive index n is highly dispersive in one wavelength region, and the extinction coefficient k is highly dispersive in another wavelength region adjacent said one wavelength region, said extinction coefficient having a high value on the cut-off side of said predetermined wavelength; and passing a beam of light through said functional core at a non-normal angle of incidence α selected such that light at said predetermined wavelength strikes said interface at a critical angle whereby total internal reflection occurs in said functional core and on the cut-off side of said predetermined wavelength transmission is inhibited by a high value of said extinction coefficient.

18. A method as claimed in claim 17, further comprising the step of varying said angle of incidence to change the wavelength at which said transition occurs and thereby said predetermined cut-off wavelength.

19. A method as claimed in claim 18 wherein said extinction coefficient is high on the long wavelength side of the cut-off wavelength so as to provide a long wavelength cut-off filter.

20. A method as claimed in claim 17, wherein said functional core is selected from the group consisting of: transparent conducting materials and Reststrahlen materials.

21. A method as claimed in claim 17, wherein said functional core includes anti-reflective coating to reduce the ripple in the transmission band.

* * * * *